United States Patent
Dutta

(10) Patent No.: US 11,924,248 B2
(45) Date of Patent: Mar. 5, 2024

(54) SECURE COMMUNICATIONS USING SECURE SESSIONS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/923,412

(22) Filed: Jul. 8, 2020

(65) Prior Publication Data

US 2022/0014553 A1    Jan. 13, 2022

(51) Int. Cl.
| | |
|---|---|
| *H04L 9/40* | (2022.01) |
| *H04L 65/61* | (2022.01) |
| *H04L 69/00* | (2022.01) |
| *H04L 69/322* | (2022.01) |

(52) U.S. Cl.
CPC ............ *H04L 63/166* (2013.01); *H04L 65/61* (2022.05); *H04L 69/03* (2013.01); *H04L 69/322* (2013.01); *H04L 63/162* (2013.01); *H04L 63/164* (2013.01)

(58) Field of Classification Search
None
See application file for complete search history.

(56) References Cited

U.S. PATENT DOCUMENTS

| | | | | |
|---|---|---|---|---|
| 7,961,756 B1 | * | 6/2011 | Lambert | ................ H04L 69/32 455/574 |
| 10,771,523 B1 | * | 9/2020 | Carney Landow | ......................... H04W 12/0431 |

(Continued)

FOREIGN PATENT DOCUMENTS

| | | | | |
|---|---|---|---|---|
| CN | WO2021023379 A1 | * | 8/2019 | ........... H04L 12/861 |

OTHER PUBLICATIONS

Rescorla, E., "The Transport Layer Security (TLS) Protocol Version 1.3," RFC 8446, Internet Engineering Task Force (IETF), Aug. 2018, 160 pages.

(Continued)

*Primary Examiner* — Phyllis A Book
(74) *Attorney, Agent, or Firm* — Tong, Rea, Bentley & Kim, LLC

(57) ABSTRACT

Various example embodiments for supporting secure communications via secure sessions in communication systems are presented. Various example embodiments for supporting secure communications via secure sessions in communication systems may be configured to support mechanisms in a session layer protocol which enable communications of any communication protocol at any communication protocol layer to be transported over a session layer session (e.g., tunneling any data link protocol, any network layer protocol, any transport layer protocol, and/or any application layer protocol transparently over the session layer protocol), which enable multiple communications of one or more communication protocols of one or more communication protocol layers to be transported over a single session layer session (e.g., multiplexing two or more data streams of any data link protocol, any network layer protocol, any transport layer protocol, and/or any application layer protocol transparently over the session layer protocol), and so forth.

15 Claims, 14 Drawing Sheets

(56) References Cited

U.S. PATENT DOCUMENTS

| | | | | |
|---|---|---|---|---|
| 2016/0021220 | A1* | 1/2016 | Weinrib | H04L 69/162 370/474 |
| 2016/0112488 | A1* | 4/2016 | Oksanen | H04L 63/1408 709/219 |
| 2017/0339258 | A1* | 11/2017 | Momchilov | H04L 69/162 |
| 2019/0124123 | A1* | 4/2019 | Higgins | H04L 63/061 |
| 2019/0373511 | A1* | 12/2019 | Oyman | H04W 76/27 |
| 2020/0213151 | A1* | 7/2020 | Srivatsan | H04L 45/72 |

OTHER PUBLICATIONS

Rescorla, E., et al., "Datagram Transport Layer Security Version 1.2", RFC 6347, Internet Engineering Task Force (IETF), Jan. 2012, 32 pages.

Friedl, S., et al., "Transport Layer Security (TLS) Application-Layer Protocol Negotiation Extension," RFC 7301, Internet Engineering Task Force (IETF), Jul. 2014, 9 pages.

Fielding, E., et al., "Hypertext Transfer Protocol (HTTP/1.1): Message Syntax and Routing," RFC 7230, Internet Engineering Task Force (IETF), Jun. 2014, 89 pages.

The Chromium Projects, "SPDY Protocol—Draft 1," printed on Jul. 8, 2020 from http://dev.chromium.org/spdy/spdy-protocol/spdy-protocol-draft1, 16 pages.

The Chromium Projects, "SPDY Protocol—Draft 2," printed on Jul. 8, 2020 from http://dev.chromium.org/spdy/spdy-protocol/spdy-protocol-draft2, 21 pages.

The Chromium Projects, "SPDY Protocol—Draft 3," printed on Jul. 8, 2020 from http://dev.chromium.org/spdy/spdy-protocol/spdy-protocol-draft3, 32 pages.

Iana, "IEEE 802 Numbers," printed on Jul. 8, 2020 from https://www.iana.org/assignments/ieee-802-numbers/ieee-802-numbers.xhtml, 16 pages.

Iana, "Protocol Numbers," printed on Jul. 8, 2020 from https://www.iana.org/assignments/protocol-numbers/protocol-numbers.xhtml#protocol-numbers-1, 10 pages.

Iana, "Service Name and Transport Protocol Port Number Registry," printed on Jul. 8, 2020 from https://www.iana.org/assignments/service-names-port-numbers/service-names-port-numbers.xhtml, 6 pages.

Iana, Transport Layer Security (TLS) Parameters, printed on Jul. 8, 2020 from https://www.iana.org/assignments/tls-parameters/tls-parameters.xhtml, 31 pages.

Microsoft, "Secure Socket Tunneling Protocol (SSTP)," Microsoft Corporation, Version 20180912, Sep. 12, 2018, 90 pages.

Iyengar, et al., "Quic: A UDP-Based Multiplexed and Secure Transport," draft-ietf-quic-transport-29, Internet-Draft, Internet Engineering Task Force, IETF, Jun. 10, 2020, 187 pages.

Extended European Search Report mailed in Corresponding EP Application No. EP 21173768.9, dated Oct. 29, 2021, 9 pages.

* cited by examiner

*FIG. 4*

MLPN EXTENSION 400

```
enum {
   multi_layer_protocol_negotiation(20), (65535)
} ExtensionType;
```

The "extension_data" field of the ("multi_layer_protocol_negotiation(16)") extension SHALL
contain a "MultiLayerProtocolList" value.

```
opaque LayerName<1..2^8-1>;

struct {
   uint_16    protocol_list<2..2^16-1>;
} ProtocolList;

struct {
   LayerName      layer_name;
   ProtocolList   protocols;
} LayerProtocolList;

struct {
   LayerProtocolList        layer_protocol_list
<2..2^16-1>
} MultiLayerProtocolList;
```

*FIG. 9*

TLS MP RECORD
900

| Byte | +0 | +1 | +2 | +3 |
|---|---|---|---|---|
| 0 | Content type | | | |
| 1..4 | Version | | Length | |
| 5..n | Payload | | | |
| n..m | MAC | | | |
| m..p | Padding (block ciphers only) | | | |

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                     TLS MP Frame 1 (*)                     ...
+-+-+-+-+-+-+-+-+-+-+-+-+-+-+-+-+-+-+-+-+-+-+-+-+-+-+-+-+-+-+-+-+
|                     TLS MP Frame 2 (*)                     ...
+-+-+-+-+-+-+-+-+-+-+-+-+-+-+-+-+-+-+-+-+-+-+-+-+-+-+-+-+-+-+-+-+
                                ...
+-+-+-+-+-+-+-+-+-+-+-+-+-+-+-+-+-+-+-+-+-+-+-+-+-+-+-+-+-+-+-+-+
|                     TLS MP Frame N (*)                     ...
+-+-+-+-+-+-+-+-+-+-+-+-+-+-+-+-+-+-+-+-+-+-+-+-+-+-+-+-+-+-+-+-+
```

*FIG. 10*

TLS MP FRAME
1000

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Layer Type   |     Flags     |         Protocol ID           |
+-+-+-+-+-+-+-+-+-+-+-+-+-+-+-+-+-+-+-+-+-+-+-+-+-+-+-+-+-+-+-+-+
|           Stream ID           |            Length             |
+-+-+-+-+-+-+-+-+-+-+-+-+-+-+-+-+-+-+-+-+-+-+-+-+-+-+-+-+-+-+-+-+
|            Offset             |                               |
+-+-+-+-+-+-+-+-+-+-+-+-+-+-+-+-+                               +
|                                                               |
~                         Stream Data                           ~
|                             ...                               |
+-+-+-+-+-+-+-+-+-+-+-+-+-+-+-+-+-+-+-+-+-+-+-+-+-+-+-+-+-+-+-+-+
```

SECURE COMMUNICATIONS USING SECURE SESSIONS

TECHNICAL FIELD

Various example embodiments relate generally to communication systems and, more particularly but not exclusively, to supporting secure communications via secure sessions in various types of communication systems.

BACKGROUND

In many communication networks, various communications technologies may be used to support secure communications via secure sessions.

SUMMARY

In at least some example embodiments, an apparatus includes at least one processor and at least one memory including a set of instructions, wherein the set of instructions is configured to, when executed by the at least one processor, cause the apparatus to support, by a communication device over a session layer protocol at a session layer, communication of a data stream of a communication protocol of a communication protocol layer, wherein the communication protocol layer is below the session layer. In at least some example embodiments, the communication protocol layer includes at least one of a transport layer, a network layer, or a data link layer. In at least some example embodiments, to support communication of the data stream of the communication protocol of the communication protocol layer, the set of instructions is configured to, when executed by the at least one processor, cause the apparatus to support, by the communication device, negotiation of a set of communication protocols to be supported on the session layer protocol. In at least some example embodiments, to support negotiation of the set of communication protocols, the set of instructions is configured to, when executed by the at least one processor, cause the apparatus to send, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, to support negotiation of the set of communication protocols, the set of instructions is configured to, when executed by the at least one processor, cause the apparatus to receive, by the communication device from a second communication device, a message including an indication of a set of communication protocols supported by the second communication device at the session layer and select, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, to support communication of the data stream of the communication protocol of the communication protocol layer, the set of instructions is configured to, when executed by the at least one processor, cause the apparatus to support, by the communication device over the session layer protocol of the session layer, communication of a packet of the session layer protocol that includes a packet of the data stream. In at least some example embodiments, the packet of the data stream includes a payload including data of the data stream, and the packet of the data stream includes a header including an indication of the communication protocol layer of the data stream, an indication of the communication protocol of the data stream, and a stream identifier of the data stream. In at least some example embodiments, the session layer protocol includes a Transport Layer Security (TLS) protocol, the packet of the session layer protocol includes a TLS Record, and the packet of the data stream is transported using a TLS Frame. In at least some example embodiments, to support communication of the data stream of the communication protocol of the communication protocol layer, the set of instructions is configured to, when executed by the at least one processor, cause the apparatus to send, by the communication device over the session layer protocol of the session layer, a packet of the session layer protocol that includes a packet of the data stream. In at least some example embodiments, to support communication of the data stream of the communication protocol of the communication protocol layer, the set of instructions is configured to, when executed by the at least one processor, cause the apparatus to receive, by the communication device over the session layer protocol of the session layer, a packet of the session layer protocol that includes a packet of the data stream, wherein the packet of the data stream includes a payload including data of the data stream, and wherein the packet of the data stream includes a header including an indication of the communication protocol layer of the data stream, an indication of the communication protocol of the data stream, and a stream identifier of the data stream and retrieve, based on identification of the data of the data stream based on the indication of the communication protocol layer of the data stream, the indication of the communication protocol of the data stream, and the stream identifier of the data stream, the data of the data stream. In at least some example embodiments, the set of instructions is configured to, when executed by the at least one processor, cause the apparatus to support, by the communication device over the session layer protocol, communication of a second data stream. In at least some example embodiments, the second data stream uses the communication protocol of the communication protocol layer. In at least some example embodiments, the second data stream uses a second communication protocol of the communication protocol layer. In at least some example embodiments, the second data stream uses a second communication protocol of a second communication protocol layer. In at least some example embodiments, the second communication protocol layer includes one of an application layer, a transport layer, a network layer, or a data link layer.

In at least some example embodiments, a non-transitory computer-readable medium stores a set of instructions configured to cause an apparatus to support, by a communication device over a session layer protocol at a session layer, communication of a data stream of a communication protocol of a communication protocol layer, wherein the communication protocol layer is below the session layer. In at least some example embodiments, the communication protocol layer includes at least one of a transport layer, a network layer, or a data link layer. In at least some example embodiments, to support communication of the data stream of the communication protocol of the communication protocol layer, the set of instructions is configured to cause the apparatus to support, by the communication device, negotiation of a set of communication protocols to be supported on the session layer protocol. In at least some example embodiments, to support negotiation of the set of communication protocols, the set of instructions is configured to cause the apparatus to send, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, to support negotiation of the set of communication protocols, the set of instructions is configured to cause the apparatus to receive, by the communication device from a second communication device, a message including an indication of a set of communication protocols supported by the second communication device at the session layer and select, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, to support communication of the data stream of the communication protocol of the communication protocol layer, the set of instructions is configured to cause the apparatus to support, by the communication device over the session layer protocol of the session layer, communication of a packet of the session layer protocol that includes a packet of the data stream. In at least some example embodiments, the packet of the data stream includes a payload including data of the data stream, and the packet of the data stream includes a header including an indication of the communication protocol layer of the data stream, an indication of the communication protocol of the data stream, and a stream identifier of the data stream. In at least some example embodiments, the session layer protocol includes a Transport Layer Security (TLS) protocol, the packet of the session layer protocol includes a TLS Record, and the packet of the data stream is transported using a TLS Frame. In at least some example embodiments, to support communication of the data stream of the communication protocol of the communication protocol layer, the set of instructions is configured to cause the apparatus to send, by the communication device over the session layer protocol of the session layer, a packet of the session layer protocol that includes a packet of the data stream. In at least some example embodiments, to support communication of the data stream of the communication protocol of the communication protocol layer, the set of instructions is configured to cause the apparatus to receive, by the communication device over the session layer protocol of the session layer, a packet of the session layer protocol that includes a packet of the data stream, wherein the packet of the data stream includes a payload including data of the data stream, and wherein the packet of the data stream includes a header including an indication of the communication protocol layer of the data stream, an indication of the communication protocol of the data stream, and a stream identifier of the data stream and retrieve, based on identification of the data of the data stream based on the indication of the communication protocol layer of the data stream, the indication of the communication protocol of the data stream, and the stream identifier of the data stream, the data of the data stream. In at least some example embodiments, the set of instructions is configured to cause the apparatus to support, by the communication device over the session layer protocol, communication of a second data stream. In at least some example embodiments, the second data stream uses the communication protocol of the communication protocol layer. In at least some example embodiments, the second data stream uses a second communication protocol of the communication protocol layer. In at least some example embodiments, the second data stream uses a second communication protocol of a second communication protocol layer. In at least some example embodiments, the second communication protocol layer includes one of an application layer, a transport layer, a network layer, or a data link layer.

In at least some example embodiments, a method includes supporting, by a communication device over a session layer protocol at a session layer, communication of a data stream of a communication protocol of a communication protocol layer, wherein the communication protocol layer is below the session layer. In at least some example embodiments, the communication protocol layer includes at least one of a transport layer, a network layer, or a data link layer. In at least some example embodiments, supporting communication of the data stream of the communication protocol of the communication protocol layer includes supporting, by the communication device, negotiation of a set of communication protocols to be supported on the session layer protocol. In at least some example embodiments, supporting negotiation of the set of communication protocols includes sending, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, supporting negotiation of the set of communication protocols includes receiving, by the communication device from a second communication device, a message including an indication of a set of communication protocols supported by the second communication device at the session layer and selecting, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, supporting communication of the data stream of the communication protocol of the communication protocol layer includes supporting, by the communication device over the session layer protocol of the session layer, communication of a packet of the session layer protocol that includes a packet of the data stream. In at least some example embodiments, the packet of the data stream includes a payload including data of the data stream, and the packet of the data stream includes a header including an indication of the communication protocol layer of the data stream, an indication of the communication protocol of the data stream, and a stream identifier of the data stream. In at least some example embodiments, the session layer protocol includes a Transport Layer Security (TLS) protocol, the packet of the session layer protocol includes a TLS Record, and the packet of the data stream is transported using a TLS Frame. In at least some example embodiments, supporting communication of the data stream of the communication protocol of the communication protocol layer includes sending, by the communication device over the session layer protocol of the session layer, a packet of the session layer protocol that includes a packet of the data stream. In at least some example embodiments, supporting communication of the data stream of the communication protocol of the communication protocol layer includes receiving, by the communication device over the session layer protocol of the session layer, a packet of the session layer protocol that includes a packet of the data stream, wherein the packet of the data stream includes a payload including data of the data stream, and wherein the packet of the data stream includes a header including an indication of the communication protocol layer of the data stream, an indication of the communication protocol of the data stream, and a stream identifier of the data stream and retrieving, based on identification of the data of the data stream based on the indication of the communication protocol layer of the data stream, the indication of the communication protocol of the data stream, and the stream identifier of the data stream, the data of the data stream. In at least some example embodiments, the method includes supporting, by the communication device over the session layer protocol, communication of a second data stream. In at least some example embodiments, the second data stream uses the communication protocol of the communication protocol layer. In at least some example embodiments, the second data stream uses a second communication protocol of the communication protocol layer. In at least some example embodiments, the second data stream uses a second communication protocol of a second communication protocol layer. In at least some example embodiments, the second communication protocol layer includes one of an application layer, a transport layer, a network layer, or a data link layer.

In at least some example embodiments, an apparatus includes means for supporting, by a communication device over a session layer protocol at a session layer, communication of a data stream of a communication protocol of a communication protocol layer, wherein the communication protocol layer is below the session layer. In at least some example embodiments, the communication protocol layer includes at least one of a transport layer, a network layer, or a data link layer. In at least some example embodiments, the means for supporting communication of the data stream of the communication protocol of the communication protocol layer includes means for supporting, by the communication device, negotiation of a set of communication protocols to be supported on the session layer protocol. In at least some example embodiments, the means for supporting negotiation of the set of communication protocols includes means for sending, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, the means for supporting negotiation of the set of communication protocols includes means for receiving, by the communication device from a second communication device, a message including an indication of a set of communication protocols supported by the second communication device at the session layer and means for selecting, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, the means for supporting communication of the data stream of the communication protocol of the communication protocol layer includes means for supporting, by the communication device over the session layer protocol of the session layer, communication of a packet of the session layer protocol that includes a packet of the data stream. In at least some example embodiments, the packet of the data stream includes a payload including data of the data stream, and the packet of the data stream includes a header including an indication of the communication protocol layer of the data stream, an indication of the communication protocol of the data stream, and a stream identifier of the data stream. In at least some example embodiments, the session layer protocol includes a Transport Layer Security (TLS) protocol, the packet of the session layer protocol includes a TLS Record, and the packet of the data stream is transported using a TLS Frame. In at least some example embodiments, the means for supporting communication of the data stream of the communication protocol of the communication protocol layer includes means for sending, by the communication device over the session layer protocol of the session layer, a packet of the session layer protocol that includes a packet of the data stream. In at least some example embodiments, the means for supporting communication of the data stream of the communication protocol of the communication protocol layer includes means for receiving, by the communication device over the session layer protocol of the session layer, a packet of the session layer protocol that includes a packet of the data stream, wherein the packet of the data stream includes a payload including data of the data stream, and wherein the packet of the data stream includes a header including an indication of the communication protocol layer of the data stream, an indication of the communication protocol of the data stream, and a stream identifier of the data stream and means for retrieving, based on identification of the data of the data stream based on the indication of the communication protocol layer of the data stream, the indication of the communication protocol of the data stream, and the stream identifier of the data stream, the data of the data stream. In at least some example embodiments, the apparatus includes means for supporting, by the communication device over the session layer protocol, communication of a second data stream. In at least some example embodiments, the second data stream uses the communication protocol of the communication protocol layer. In at least some example embodiments, the second data stream uses a second communication protocol of the communication protocol layer. In at least some example embodiments, the second data stream uses a second communication protocol of a second communication protocol layer. In at least some example embodiments, the second communication protocol layer includes one of an application layer, a transport layer, a network layer, or a data link layer.

In at least some example embodiments, an apparatus includes at least one processor and at least one memory including a set of instructions, wherein the set of instructions is configured to, when executed by the at least one processor, cause the apparatus to support, by a communication device over a session layer protocol at a session layer, multiplexing of a set of data streams. In at least some example embodiments, the set of data streams includes at least two data streams at a communication protocol layer above the session layer. In at least some example embodiments, the set of data streams includes at least two data streams at a communication protocol layer below the session layer. In at least some example embodiments, the set of data streams includes a first data stream at a first communication protocol layer and a second data stream at a second communication protocol layer, wherein the first communication protocol layer and the second communication protocol layer are different. In at least some example embodiments, the first communication protocol layer is an application layer protocol and the second communication protocol layer is a communication protocol layer below the session layer. In at least some example embodiments, the first communication protocol layer and the second communication protocol layer are below the session layer. In at least some example embodiments, to support multiplexing of the set of data streams, the set of instructions is configured to, when executed by the at least one processor, cause the apparatus to support, by the communication device, negotiation of a set of communication protocols to be supported on the session layer protocol. In at least some example embodiments, to support negotiation of the set of communication protocols to be supported on the session layer protocol, the set of instructions is configured to, when executed by the at least one processor, cause the apparatus to send, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, to support negotiation of the set of communication protocols, the set of instructions is configured to, when executed by the at least one processor, cause the apparatus to receive, by the communication device from a second communication device, a message including an indication of a set of communication protocols supported by the second communication device at the session layer and select, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, to support multiplexing of the set of data streams, the set of instructions is configured to, when executed by the at least one processor, cause the apparatus to support, by the communication device over the session layer protocol of the session layer, communication of a packet of the session layer protocol that includes, for each of the data streams, a respective packet of the respective data stream. In at least some example embodiments, for at least one of the data streams, the respective packet of the respective data stream includes a payload including data of the respective data stream, and the packet of the respective data stream includes a header including an indication of the communication protocol layer of the respective data stream, an indication of the communication protocol of the respective data stream, and a stream identifier of the respective data stream. In at least some example embodiments, the session layer protocol includes a Transport Layer Security (TLS) protocol, the packet of the session layer protocol includes a TLS Record, and the respective packets of the respective data streams are transported using respective TLS Frames. In at least some example embodiments, to support multiplexing of the set of data streams, the set of instructions is configured to, when executed by the at least one processor, cause the apparatus to send, by the communication device over the session layer protocol of the session layer, a packet of the session layer protocol that includes, for each of the data streams, a respective packet of the respective data stream. In at least some example embodiments, to support multiplexing of the set of data streams, the set of instructions is configured to, when executed by the at least one processor, cause the apparatus to receive, by the communication device over the session layer protocol of the session layer, a packet of the session layer protocol that includes, for each of the data streams, a respective packet of the respective data stream including a payload including data of the respective data stream and including a header including an indication of the communication protocol layer of the respective data stream, an indication of the communication protocol of the respective data stream, and a stream identifier of the respective data stream and retrieve, for each of the data streams from the packet of the session layer protocol based on identification of the data of the data stream based on the indication of the communication protocol layer of the respective data stream, the indication of the communication protocol of the respective data stream, and the stream identifier of the respective data stream, the data of the respective data stream.

In at least some example embodiments, a non-transitory computer-readable medium stores a set of instructions configured to cause an apparatus to support, by a communication device over a session layer protocol at a session layer, multiplexing of a set of data streams. In at least some example embodiments, the set of data streams includes at least two data streams at a communication protocol layer above the session layer. In at least some example embodiments, the set of data streams includes at least two data streams at a communication protocol layer below the session layer. In at least some example embodiments, the set of data streams includes a first data stream at a first communication protocol layer and a second data stream at a second communication protocol layer, wherein the first communication protocol layer and the second communication protocol layer are different. In at least some example embodiments, the first communication protocol layer is an application layer protocol and the second communication protocol layer is a communication protocol layer below the session layer. In at least some example embodiments, the first communication protocol layer and the second communication protocol layer are below the session layer. In at least some example embodiments, to support multiplexing of the set of data streams, the set of instructions is configured to cause the apparatus to support, by the communication device, negotiation of a set of communication protocols to be supported on the session layer protocol. In at least some example embodiments, to support negotiation of the set of communication protocols to be supported on the session layer protocol, the set of instructions is configured to cause the apparatus to send, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, to support negotiation of the set of communication protocols, the set of instructions is configured to cause the apparatus to receive, by the communication device from a second communication device, a message including an indication of a set of communication protocols supported by the second communication device at the session layer and select, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, to support multiplexing of the set of data streams, the set of instructions is configured to cause the apparatus to support, by the communication device over the session layer protocol of the session layer, communication of a packet of the session layer protocol that includes, for each of the data streams, a respective packet of the respective data stream. In at least some example embodiments, for at least one of the data streams, the respective packet of the respective data stream includes a payload including data of the respective data stream, and the packet of the respective data stream includes a header including an indication of the communication protocol layer of the respective data stream, an indication of the communication protocol of the respective data stream, and a stream identifier of the respective data stream. In at least some example embodiments, the session layer protocol includes a Transport Layer Security (TLS) protocol, the packet of the session layer protocol includes a TLS Record, and the respective packets of the respective data streams are transported using respective TLS Frames. In at least some example embodiments, to support multiplexing of the set of data streams, the set of instructions is configured to cause the apparatus to send, by the communication device over the session layer protocol of the session layer, a packet of the session layer protocol that includes, for each of the data streams, a respective packet of the respective data stream. In at least some example embodiments, to support multiplexing of the set of data streams, the set of instructions is configured to cause the apparatus to receive, by the communication device over the session layer protocol of the session layer, a packet of the session layer protocol that includes, for each of the data streams, a respective packet of the respective data stream including a payload including data of the respective data stream and including a header including an indication of the communication protocol layer of the respective data stream, an indication of the communication protocol of the respective data stream, and a stream identifier of the respective data stream and retrieve, for each of the data streams from the packet of the session layer protocol based on identification of the data of the data stream based on the indication of the communication protocol layer of the respective data stream, the indication of the communication protocol of the respective data stream, and the stream identifier of the respective data stream, the data of the respective data stream.

In at least some example embodiments, a method includes supporting, by a communication device over a session layer protocol at a session layer, multiplexing of a set of data streams. In at least some example embodiments, the set of data streams includes at least two data streams at a communication protocol layer above the session layer. In at least some example embodiments, the set of data streams includes at least two data streams at a communication protocol layer below the session layer. In at least some example embodiments, the set of data streams includes a first data stream at a first communication protocol layer and a second data stream at a second communication protocol layer, wherein the first communication protocol layer and the second communication protocol layer are different. In at least some example embodiments, the first communication protocol layer is an application layer protocol and the second communication protocol layer is a communication protocol layer below the session layer. In at least some example embodiments, the first communication protocol layer and the second communication protocol layer are below the session layer. In at least some example embodiments, supporting multiplexing of the set of data streams includes supporting, by the communication device, negotiation of a set of communication protocols to be supported on the session layer protocol. In at least some example embodiments, supporting negotiation of the set of communication protocols to be supported on the session layer protocol includes sending, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, supporting negotiation of the set of communication protocols includes receiving, by the communication device from a second communication device, a message including an indication of a set of communication protocols supported by the second communication device at the session layer and selecting, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, supporting multiplexing of the set of data streams includes supporting, by the communication device over the session layer protocol of the session layer, communication of a packet of the session layer protocol that includes, for each of the data streams, a respective packet of the respective data stream. In at least some example embodiments, for at least one of the data streams, the respective packet of the respective data stream includes a payload including data of the respective data stream, and the packet of the respective data stream includes a header including an indication of the communication protocol layer of the respective data stream, an indication of the communication protocol of the respective data stream, and a stream identifier of the respective data stream. In at least some example embodiments, the session layer protocol includes a Transport Layer Security (TLS) protocol, the packet of the session layer protocol includes a TLS Record, and the respective packets of the respective data streams are transported using respective TLS Frames. In at least some example embodiments, supporting multiplexing of the set of data streams includes sending, by the communication device over the session layer protocol of the session layer, a packet of the session layer protocol that includes, for each of the data streams, a respective packet of the respective data stream. In at least some example embodiments, supporting multiplexing of the set of data streams includes receiving, by the communication device over the session layer protocol of the session layer, a packet of the session layer protocol that includes, for each of the data streams, a respective packet of the respective data stream including a payload including data of the respective data stream and including a header including an indication of the communication protocol layer of the respective data stream, an indication of the communication protocol of the respective data stream, and a stream identifier of the respective data stream and retrieving, for each of the data streams from the packet of the session layer protocol based on identification of the data of the data stream based on the indication of the communication protocol layer of the respective data stream, the indication of the communication protocol of the respective data stream, and the stream identifier of the respective data stream, the data of the respective data stream.

In at least some example embodiments, an apparatus includes means for supporting, by a communication device over a session layer protocol at a session layer, multiplexing of a set of data streams. In at least some example embodiments, the set of data streams includes at least two data streams at a communication protocol layer above the session layer. In at least some example embodiments, the set of data streams includes at least two data streams at a communication protocol layer below the session layer. In at least some example embodiments, the set of data streams includes a first data stream at a first communication protocol layer and a second data stream at a second communication protocol layer, wherein the first communication protocol layer and the second communication protocol layer are different. In at least some example embodiments, the first communication protocol layer is an application layer protocol and the second communication protocol layer is a communication protocol layer below the session layer. In at least some example embodiments, the first communication protocol layer and the second communication protocol layer are below the session layer. In at least some example embodiments, the means for supporting multiplexing of the set of data streams includes means for supporting, by the communication device, negotiation of a set of communication protocols to be supported on the session layer protocol. In at least some example embodiments, the means for supporting negotiation of the set of communication protocols to be supported on the session layer protocol includes means for sending, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a Transport Layer Security (TLS) protocol, and the message includes a TLS handshake message. In at least some example embodiments, the means for supporting negotiation of the set of communication protocols includes means for receiving, by the communication device from a second communication device, a message including an indication of a set of communication protocols supported by the second communication device at the session layer and means for selecting, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, the means for supporting multiplexing of the set of data streams includes means for supporting, by the communication device over the session layer protocol of the session layer, communication of a packet of the session layer protocol that includes, for each of the data streams, a respective packet of the respective data stream. In at least some example embodiments, for at least one of the data streams, the respective packet of the respective data stream includes a payload including data of the respective data stream, and the packet of the respective data stream includes a header including an indication of the communication protocol layer of the respective data stream, an indication of the communication protocol of the respective data stream, and a stream identifier of the respective data stream. In at least some example embodiments, the session layer protocol includes a Transport Layer Security (TLS) protocol, the packet of the session layer protocol includes a TLS Record, and the respective packets of the respective data streams are transported using respective TLS Frames. In at least some example embodiments, the means for supporting multiplexing of the set of data streams includes means for sending, by the communication device over the session layer protocol of the session layer, a packet of the session layer protocol that includes, for each of the data streams, a respective packet of the respective data stream. In at least some example embodiments, the means for supporting multiplexing of the set of data streams includes means for receiving, by the communication device over the session layer protocol of the session layer, a packet of the session layer protocol that includes, for each of the data streams, a respective packet of the respective data stream including a payload including data of the respective data stream and including a header including an indication of the communication protocol layer of the respective data stream, an indication of the communication protocol of the respective data stream, and a stream identifier of the respective data stream and means for retrieving, for each of the data streams from the packet of the session layer protocol based on identification of the data of the data stream based on the indication of the communication protocol layer of the respective data stream, the indication of the communication protocol of the respective data stream, and the stream identifier of the respective data stream, the data of the respective data stream.

BRIEF DESCRIPTION OF THE DRAWINGS

The teachings herein can be readily understood by considering the following detailed description in conjunction with the accompanying drawings, in which:

FIG. 4 depicts an example embodiment of a definition of an MLPN extension for use by endpoints in a TLS handshake;

FIG. 9 depicts an example embodiment of a TLS MP Record and a Payload of a TLS MP Record;

FIG. 10 depicts an example embodiment of a TLS MP Frame configured to support transport of data;

To facilitate understanding, identical reference numerals have been used herein, wherever possible, in order to designate identical elements that are common among the various figures.

DETAILED DESCRIPTION

Figure 1:
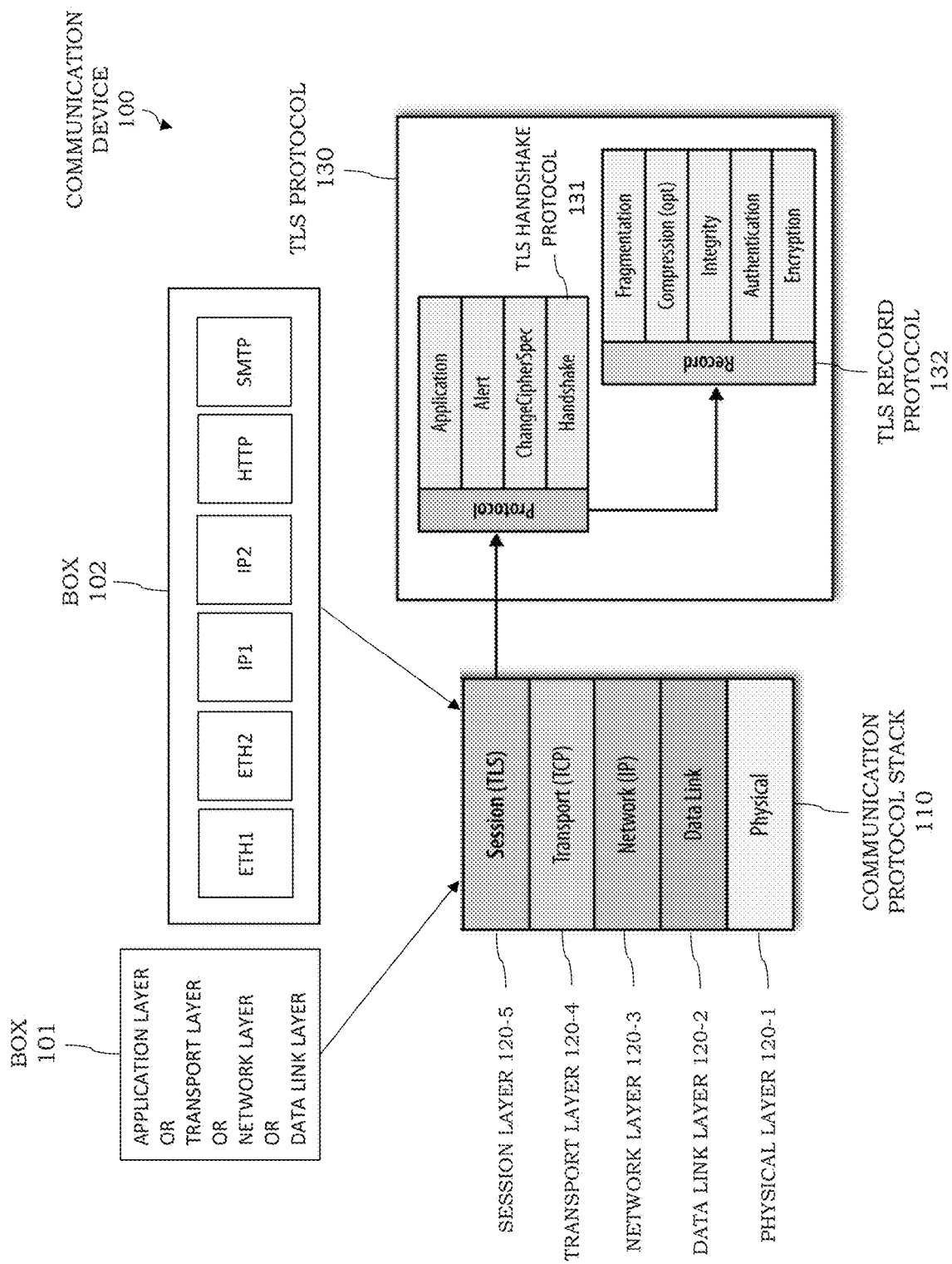
FIG. 1 depicts an example embodiment of a communication device configured to support secure communications over a secure session.

Various example embodiments for supporting secure communications via secure sessions in communication systems are presented.

Various example embodiments for supporting secure communications via secure sessions in communication systems may be configured to support secure communications based on a secure protocol operating at the session layer of the Open Systems Interconnection (OSI) model (e.g., a Transport Layer Security (TLS) protocol where the transport layer supporting the session layer is based on Transmission Control Protocol (TCP), a Datagram Transport Layer Security (DTLS) protocol where the transport layer supporting the session layer is based on User Datagram Protocol (UDP), or the like).

Various example embodiments for supporting secure communications via secure sessions in communication systems may be configured to support mechanisms in a secure session layer protocol which enable communications of any communication protocol at any communication protocol layer to be transported over a session layer session (e.g., tunneling any data link protocol, any network layer protocol, any transport layer protocol, and/or any application layer protocol transparently over the session layer protocol), which enable multiple communications of one or more communication protocols of one or more communication protocol layers to be transported over a single session layer session (e.g., multiplexing two or more data streams of any data link protocol, any network layer protocol, any transport layer protocol, and/or any application layer protocol transparently over the session layer protocol), or the like, as well as various combinations thereof.

Various example embodiments for supporting secure communications via secure sessions in communication systems may be configured to support mechanisms in the TLS protocol which enable communications of any communication protocol at any communication protocol layer to be transported over a TLS session (e.g., tunneling any data link protocol, any network layer protocol, any transport layer protocol, and/or any application layer protocol transparently over a TLS session, with minimal changes to the TLS specification), which enable multiple communications of one or more communication protocols of one or more communication protocol layers (irrespective of the communication protocol layers of the communication protocols) to be multiplexed over a single TLS session (e.g., multiplexing two or more data streams of any data link protocol, any network layer protocol, any transport layer protocol, and/or any application layer protocol transparently over the single TLS session), or the like, as well as various combinations thereof.

Various example embodiments for supporting secure communications via secure sessions in communication systems may be configured to support communication of any communication protocol at any communication protocol layer, including one or more communication protocols at one or more communication protocol layers above the session layer of the OSI model (e.g., the presentation layer, the application layer, or the like), one or more communication protocols at one or more communication protocol layers below the session layer (e.g., the transport layer, the network layer, the data link layer, or the like), or the like, as well as various combinations thereof. In at least some example embodiments, TLS may be configured to support not only tunneling of application layer protocols (e.g., Hypertext Transfer Protocol (HTTP), Simple Mail Transfer Protocol (SMTP), File Transfer Protocol (FTP), or the like), but also tunneling of transport layer protocols (e.g., Transmission Control Protocol (TCP), Stream Control Transmission Protocol (SCTP), or the like), network layer protocols (e.g., Internet Protocol (IP), Multiprotocol Label Switching (MPLS), or the like), data link layer protocols (e.g., Ethernet, Point-to-Point Protocol (PPP), High-Level Data Link Control (HDLC), IEEE 802.11 wireless LAN, Link Layer Discovery Protocol (LLDP), Packet-over-SONET (POS), or the like), or the like, as well as various combinations thereof.

Various example embodiments for supporting secure communications via secure sessions in communication systems may be configured to support a multiplexing overlay in which multiple communications (e.g., networks, communication protocols, data streams, or the like) of one or more communication protocols of one or more communication protocol layers may be tunneled over a single secure session layer session. In at least some example embodiments, TLS may be configured to support multiplexing of multiple communications (e.g., networks, communication protocols, data streams, or the like), which may be at the same communication protocol layer or different communication protocol layers, over a single TLS session. For example, a single TLS session may be configured as a tunnel that can support overlay of an Ethernet overlay network, an IP overlay network, and an HTTP-based application. For example, a single TLS session may be configured as a tunnel that can support overlay of two Ethernet overlay networks, two IP networks, an HTTP-based application, and an SMTP-based application. It will be appreciated that these example are merely a few of the ways in which a single TLS session may be used to support multiplexing of multiple communications of one or more communication protocols of one or more communication protocol layers over a single secure session layer session (e.g., fewer or more such communications may be supported, other types of communications may be supported, other communication protocols may be supported, other communication protocol layers may be supported, or the like, as well as various combinations thereof).

It will be appreciated that although primarily presented herein with respect to example embodiments in which the secure session is provided using a particular protocol (namely, the TLS protocol) at a particular layer of the OSI model (namely, the session layer), various example embodiments presented herein may be used or adapted for use with various types of communication protocols which may be provided at various layers of the OSI model or at various layers which may be defined within various other types of protocol layer models (e.g., FiberChannel, or the like).

It will be appreciated that these and various other example embodiments and advantages or potential advantages of supporting secure communications via secure sessions in communication systems may be further understood by way of reference to the various figures, which are discussed further below.

FIG. 1 depicts an example embodiment of a communication device configured to support secure communications over a secure session.

The communication device 100 includes a communication protocol stack 110, which is configured to support communications of the communication device 100. The communication protocol stack 110 is based on the OSI model and, thus, includes a set of communication protocol layers 120-1-120-5 (collectively, communication protocol layers 120) of the OSI model. The communication protocol layers 120 include a physical layer 120-1 at the lowest layer, a data link layer 120-2 above the physical layer 120-1, a network layer 120-3 above the data link layer 120-2, a transport layer 120-4 above the network layer 120-3, and a session layer 120-5 above the transport layer 120-4. It will be appreciated that, although omitted for purposes of clarity in order to illustrate transport of communication protocols of communication protocol layers over the session layer 120-5, the communication protocol stack 110 also may include a presentation layer and an application layer. The communication protocol layers 120 may support various communication protocols which may be supported at such communication protocol layers 120, examples of which are indicated in FIG. 1 (illustratively, use of IP at the network layer 120-3, use of TCP at the transport layer 120-4, and use of TLS at the session layer 120-5). It will be appreciated that, in the communication protocol stack 110, other protocols may be used at any of the communication protocol layers 120 (e.g., Ethernet or PPP at the data link layer 120-2, ICMP or IPSec at the network layer 120-3, SCTP or UDP at the transport layer 120-4, SMTP or FTP at the application layer 120-6, and so forth). It will be appreciated that the set of communication protocol layers 120 of the communication protocol stack 110 may include fewer OSI layers, more OSI layers, or the like. It will be appreciated that the communication protocol stack 110 and, thus, the associated communication protocol layers 120, may be based on other communication protocol models.

The session layer 120-5, as indicated above, uses the TLS protocol. In general, the TLS protocol is a widely used cryptographic protocol designed to provide communications security over a computer network. The TLS protocol is standardized in the Internet Engineering Task Force (IETF), and there are several versions (e.g., TLS 1.0, TLS 1.1, TLS 1.2, and TLS 1.3, with TLS 1.3 being the latest version described in RFC 8446). Various aspects of the TLS protocol are discussed further below. The TLS protocol was designed to operate on top of a reliable transport layer protocol, such as TCP as indicated in FIG. 1. The TLS protocol finds widespread use in applications such as web browsing (e.g., websites can use the TLS protocol to secure communications between their servers and web browsers), email (e.g., email providers can use the TLS protocol to secure communications between their servers and email clients), instant messaging (e.g., peers in instant messaging sessions can use the TLS protocol to secure instant messages), voice-over-IP (e.g., peers in instant messaging sessions can use the TLS protocol to communications over VoIP sessions), and the like. The TLS protocol includes a TLS Handshake protocol configured to support establishment of the TLS session and a TLS Record protocol configured to support communication of data over the TLS session.

The TLS protocol, including the TLS Handshake protocol and the TLS Record protocol, is designed to provide three essential services to the applications running above it: encryption, authentication, and data integrity. The encryption provided by the TLS protocol is a mechanism to obfuscate what is sent between computers. The authentication provided by the TLS protocol is a mechanism to verify the validity of provided identification material. The integrity provided by the TLS protocol is a mechanism to detect message tampering and forgery. The TLS protocol is designed to provide these services based on a handshake sequence known as the TLS Handshake. The endpoint that initiates the TLS session setup (and, thus, initiates the TLS Handshake) is the "client" and the peer endpoint is the "server".

The TLS protocol, as indicated above, is configured to provide encryption for supporting secure communications between endpoints. In order to establish a cryptographically secure data channel, the endpoints must agree on which cipher suites will be used and the keys used to encrypt the data. This exchange is performed within the context of the TLS Handshake. The TLS Handshake uses public key cryptography (also known as asymmetric key cryptography), which allows the peers to negotiate a shared secret key, over an unencrypted channel, without having to establish any prior knowledge of each other.

The TLS protocol, as indicated above, is configured to provide authentication for supporting secure communications between endpoints. Namely, as part of the TLS Handshake, the TLS protocol also allows both endpoints to authenticate their identity. For example, when used in the browser, this authentication mechanism allows the client to verify that the server is who it claims to be (e.g. your bank) and not someone simply pretending to be the destination by spoofing its name or IP address. This verification is based on the established chain of trust using Certificate Authorities. In addition, the server can also optionally verify the identity of the client—e.g., a company proxy server can authenticate employees, each of whom could have his own unique certificate signed by the company.

The TLS protocol, as indicated above, is configured to provide data integrity for supporting secure communications between endpoints. Namely, with encryption and authentication in place, the TLS protocol also provides its own message framing mechanism and signs each message with a message authentication code (MAC). The MAC algorithm is a one-way cryptographic hash function (effectively a checksum), the keys to which are negotiated by both endpoints. Whenever a TLS record is sent, a MAC value is generated and appended for that message, and the receiver is then able to compute and verify the sent MAC value to ensure message integrity and authenticity.

It will be appreciated that, combined, the three security mechanisms of the TLS protocol serve as a foundation for secure communications over public networks (e.g., the Internet).

The TLS Protocol, as indicated above, includes a TLS Handshake protocol. As described above, before the client and server begin exchanging data (e.g., application data, such as HTTP-based web packets) over the TLS protocol, the encrypted TLS session is negotiated using the TLS Handshake. The client and the server agree on the version of the TLS protocol, choose the ciphersuite, and verify certificates if necessary. Additionally, since the TLS session is typically run over a reliable transport, there may be additional exchanges before the client and server can negotiate the encrypted TLS session. For example, where TCP is used as the reliable transport, the TCP three-way handshake (namely, the SYN, SYN-ACK, and ACK messages) may need to be performed before the TLS Handshake is performed. In general, the TLS Handshake procedure may include: (1) the client sends a "ClientHello" to the server with a number of specifications in plain text, such as the version of the TLS protocol it is running, the list of supported ciphersuites, and other TLS options it may want to use, (2) the server picks the TLS protocol version for further communication, decides on a ciphersuite from the list provided by the client, attaches its certificate, and sends the response back as "ServerHello" to the client (and, optionally, the server can also send a request for the certificate of the client and parameters for other TLS extensions), (3) the client, assuming that both sides are able to negotiate a common version and cipher and that the client is happy with the certificate provided by the server, initiates either the Rivest-Shamir-Adleman (RSA) key exchange or the Diffie-Hellman key exchange by sending "ClientKeyExchange" which is used to establish the symmetric key for the ensuing session, (4) the server processes the key exchange parameters sent by the client, checks message integrity by verifying the MAC, and returns an encrypted "Finished" message back to the client, and (5) the client decrypts the message with the negotiated symmetric key, verifies the MAC, and, if all is well, then the TLS tunnel is established, and application data can now be sent. It will be appreciated that, although primarily presented with respect to example embodiments in which the secure session protocol is TLS and the reliable transport is provided by TCP, in at least some example embodiments the secure session protocol may be the Datagram Transport Layer Security (DTLS) protocol running over UDP (e.g., TLS also has been adapted to run over datagram protocols such as UDP and the DTLS protocol, which is based on the TLS protocol, is able to provide similar security guarantees while preserving the datagram delivery model).

The TLS Protocol, as indicated above, includes a TLS Record protocol. The data exchanged within a TLS session is framed using the TLS Record protocol. The TLS Record protocol is responsible for identifying different types of messages (e.g., handshake, alert, change_cipher_spec, application_data, or the like, via the "Content Type" field), as well as securing and verifying the integrity of each message. A typical workflow for delivering application data over the TLS Record protocol is as follows: (1) receive application data, (2) divide the application data into blocks (e.g., using a maximum of 214 bytes, or 16 KB, per record), (3) the application data is optionally compressed, (4) an authentication code is added (e.g., a MAC, a hashed MAC (HMAC), or the like), and (5) the data is encrypted using the negotiated cipher. Once the blocks are complete, the encrypted data is passed to the transport layer (e.g., the TCP layer) for transport. It will be appreciated that, on the receiving end, a reverse order of the above-described workflow is applied by the peer: decrypt the data using the negotiated cipher, verify the MAC, and extract and deliver the data to the application.

Various example embodiments support modified versions of the TLS protocol configured to support tunneling of any communication protocol at any communication protocol layer over a TLS session and to support multiplexing of multiple communications (e.g., networks, communication protocols, data streams, or the like) over a single TLS session.

The tunneling of any communication protocol, at any communication protocol layer, over a TLS session at the session layer 120-5 is represented in FIG. 1 by box 101, which illustrates that the session layer 120-5 supports tunneling not only of application layer protocols, but also of various protocols at various communication protocol layers 120 below the session layer 120-5 (namely, at the transport layer 120-5, the network layer 120-3, and the data link layer 120-2). This is illustrated in box 101 by listing each of the communication protocol layers for which communication protocols may be tunneled over a TLS session (illustratively, the application layer as well as the transport layer 120-4, the network layer 120-3, and the data link layer 120-2). It will be appreciated, as discussed further below, that various combinations of such communication protocol layers may be supported on a TLS session.

The multiplexing of multiple communications (e.g., networks, communication protocols, data streams, or the like) over a single TLS session is represented in FIG. 1 by box 102, which illustrates that the session layer 120-5 supports tunneling of multiple communication protocols which may be operating at one or more of the communication protocol layers 120 (e.g., various combinations of two or more communication protocols operating at any one or more of the application layer, the transport layer 120-5, the network layer 120-3, and the data link layer 120-2. This is illustrated in box 102 using an example in which two Ethernet (data link layer) overlay networks (labeled ETH1 and ETH2), two IP (network layer) networks (labeled IP1 and IP2), one HTTP based application (labeled HTTP), and one SMTP based application (labeled SMTP) are multiplexed over a single TLS session.

Various example embodiments support modified versions of the TLS protocol, including modified versions of the TLS Handshake protocol and the TLS Record Protocol, for supporting tunneling of any communication protocol at any communication protocol layer over a TLS session and for supporting multiplexing of multiple communications (e.g., networks, communication protocols, data streams, or the like) over a single TLS session. This is represented in FIG. 1 as TLS protocol 130 including a TLS Handshake protocol 131 and a TLS Record protocol 132.

The TLS protocol 130, including the TLS Handshake protocol 131, may be configured to support tunneling of any communication protocol at any communication protocol layer over a TLS session, multiplexing of multiple data streams (e.g., at one or more communication protocol layers) over a single TLS session, or the like, as well as various combinations thereof. The TLS Handshake protocol 131 may support such capabilities by supporting negotiation of supported communication protocol layers and associated communication protocols between the endpoints of the TLS sessions. The endpoints may provide indications of communication protocol layers supported, and, within each communication protocol layer supported, communication protocols supported, such that the two endpoints may reach an agreement of a common set of communication protocol layers and associated communication protocols supported by both endpoints and which communication protocol layers and communication protocols are to be used on the TLS session between the endpoints. The communication protocols to be used on the TLS session between the endpoints may be negotiated in various ways. The communication protocols may be negotiated in conjunction with negotiation of the communication protocol layers and in the same negotiation as the negotiation of the communication protocol layers (e.g., endpoints provide indications of communication protocol layers supported and, for each communication protocol layer supported, a set of communication protocols supported at the respective communication protocol layer). The communication protocols may be negotiated in conjunction with negotiation of the communication protocol layers but in a separate negotiation following the negotiation of the communication protocol layers (e.g., negotiation, for each communication protocol layer determined to be supported by both endpoints, of a set of communication protocols supported by the respective communication protocol layer). The communication protocols may be negotiated without there being an associated negotiation of the communication protocol layers (e.g., endpoints provide indications of communication protocols supported), although it will be appreciated that indications of communication protocol layers also may be provided (e.g., endpoints provide indications of communication protocol layers supported and, for each communication protocol layer supported, a set of communication protocols supported at the respective communication protocol layer). For example, during a TLS handshake between a pair of endpoints based on the TLS Handshake protocol, the endpoints may negotiate: (1) whether the endpoints can tunnel data link layer protocols (e.g., Ethernet, PPP, HDLC, IEEE 802.11 wireless LAN, LLDP, Frame Relay, and so forth) on the TLS session and, if supported, then the list of data link layer protocols is negotiated, (2) whether the endpoints can tunnel network layer protocols (e.g., IP, MPLS, and so forth) on the TLS session and, if supported, then the list of network layer protocols is negotiated, (3) whether the endpoints can tunnel transport layer protocols (e.g., TCP, SCTP, and so forth) and, if supported, then the list of transport layer protocols is negotiated, and (4) whether the endpoints can tunnel application layer protocols (e.g., HTTP, SMTP, and so forth) and, if supported, then the list of application layer protocols is negotiated. It will be appreciated that negotiation of the communication protocols of the communication protocol layers within the context of the TLS Handshake protocol 131 of the TLS protocol 130 may be referred to herein as "Multi-Layer Protocol Negotiation" (MLPN).

The TLS protocol 130, including the TLS Record protocol 132, may be configured to support tunneling of any communication protocol at any communication protocol layer over a TLS session, multiplexing of multiple data streams (e.g., at one or more communication protocol layers) over a single TLS session, or the like, as well as various combinations thereof. The TLS Record protocol 132 may support such capabilities by supporting multiplexing of multiple protocol data streams, at one or more communication protocol layers (e.g., multiple application layer protocol data streams, an application layer protocol data stream and one or more protocol data streams at one or more layers below the session layer, multiple protocol data streams at one or more layers below the session layer, or the like, as well as various combinations thereof), over a single TLS session. The communication of multiple protocol data streams via a single TLS session may be supported based on use of stream identifiers to uniquely distinguish between the multiple protocol data streams in the TLS session. The communication of multiple protocol data streams via a single TLS session may be supported based on use of a combination of an indication of a layer type and a protocol type for each of the multiple protocol data streams in the TLS session such that the receiving endpoint can identify the protocol specific headers of the multiple protocol data streams within the TLS session and, thus, can parse and process the protocols packets of the multiple protocol data streams. For example, after the TLS handshake is complete, the endpoints can exchange packets/data of any of the supported protocols and can multiplex packets/data of multiple protocols through an extension to the TLS Record that defines a new type of TLS Record Structure (referred to herein as a "TLS Multi-Protocol (MP) Record") that includes the existing fields of TLS Record with the following additional information: Layer Type, Protocol ID, and Stream ID. The Layer Type is configured to indicate the communication protocol layer of the data included within the payload of the TLS MP Record; namely, whether the TLS MP Record includes data at the data link layer, the network layer, the transport layer, or the application layer. The Protocol ID is configured to identify the communication protocol, within the communication protocol layer (Layer Type) of the data included within the payload of the TLS MP Record (e.g., newly defined values for identifying data link layer protocols, Ethertype values for network layer protocols, standardized Protocol values defined for IP for transport layer protocols or other protocols based upon IP, standardized port numbers in transport layer protocols (e.g., standardized port numbers in TCP, SCTP, UDP, and so forth) for application layer protocols, and the like). The Stream ID is the identifier of the stream associated with the payload of the TLS MP Record. The receiving endpoint is configured to use the Layer Type, Protocol ID, and Stream ID to parse and process received protocol packets (e.g., the receiving endpoint, based on the {Layer Type, Protocol Type} tuple, looks for the protocol-specific header within the payload and parses the protocol packet based on the rules defining the protocol-specific header for the communication protocol).

Figure 2:
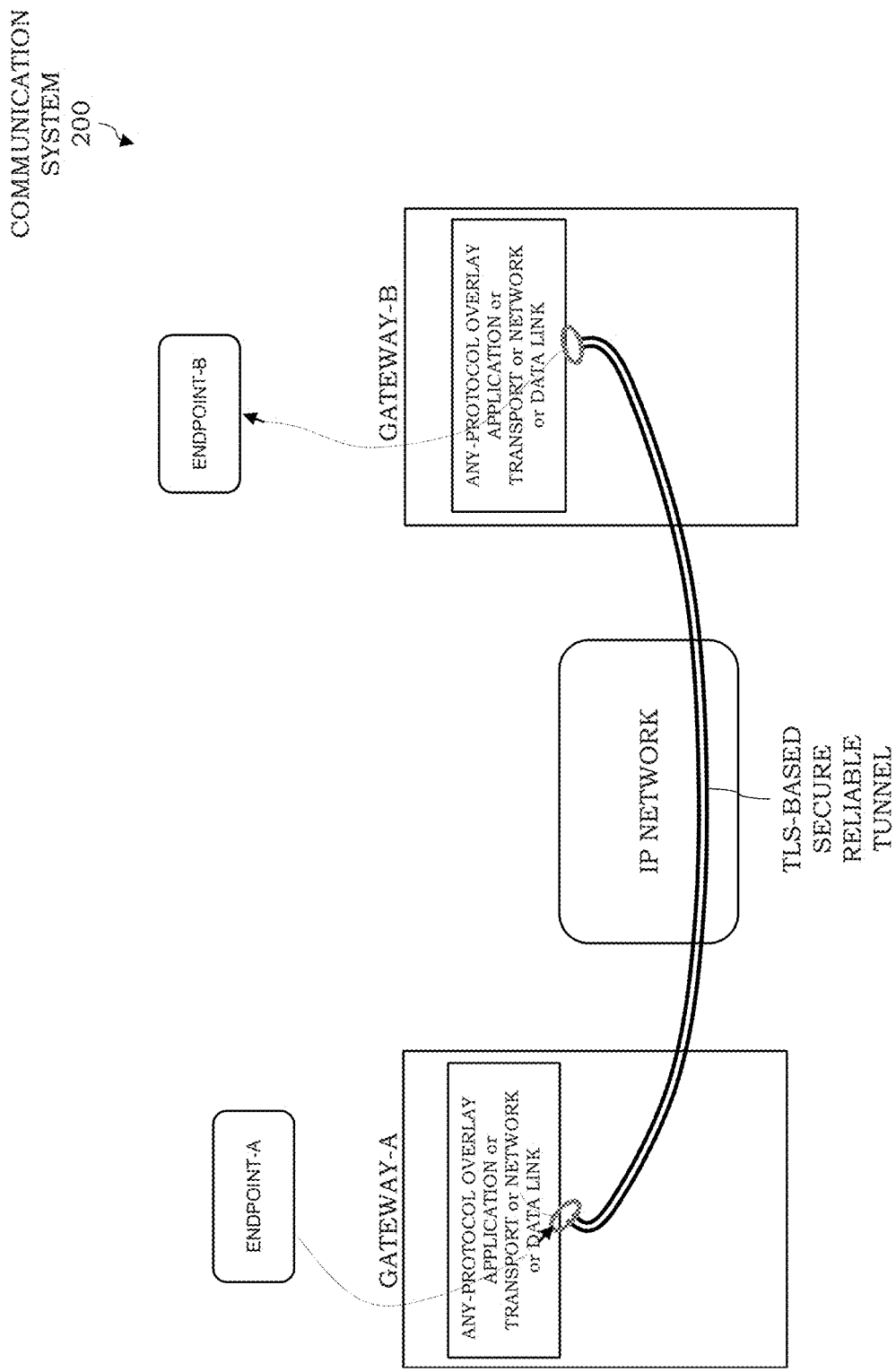
FIG. 2 depicts an example embodiment of a communication system configured to support tunneling of any communication protocol, at any communication protocol layer, over a TLS session.
Figure 3:
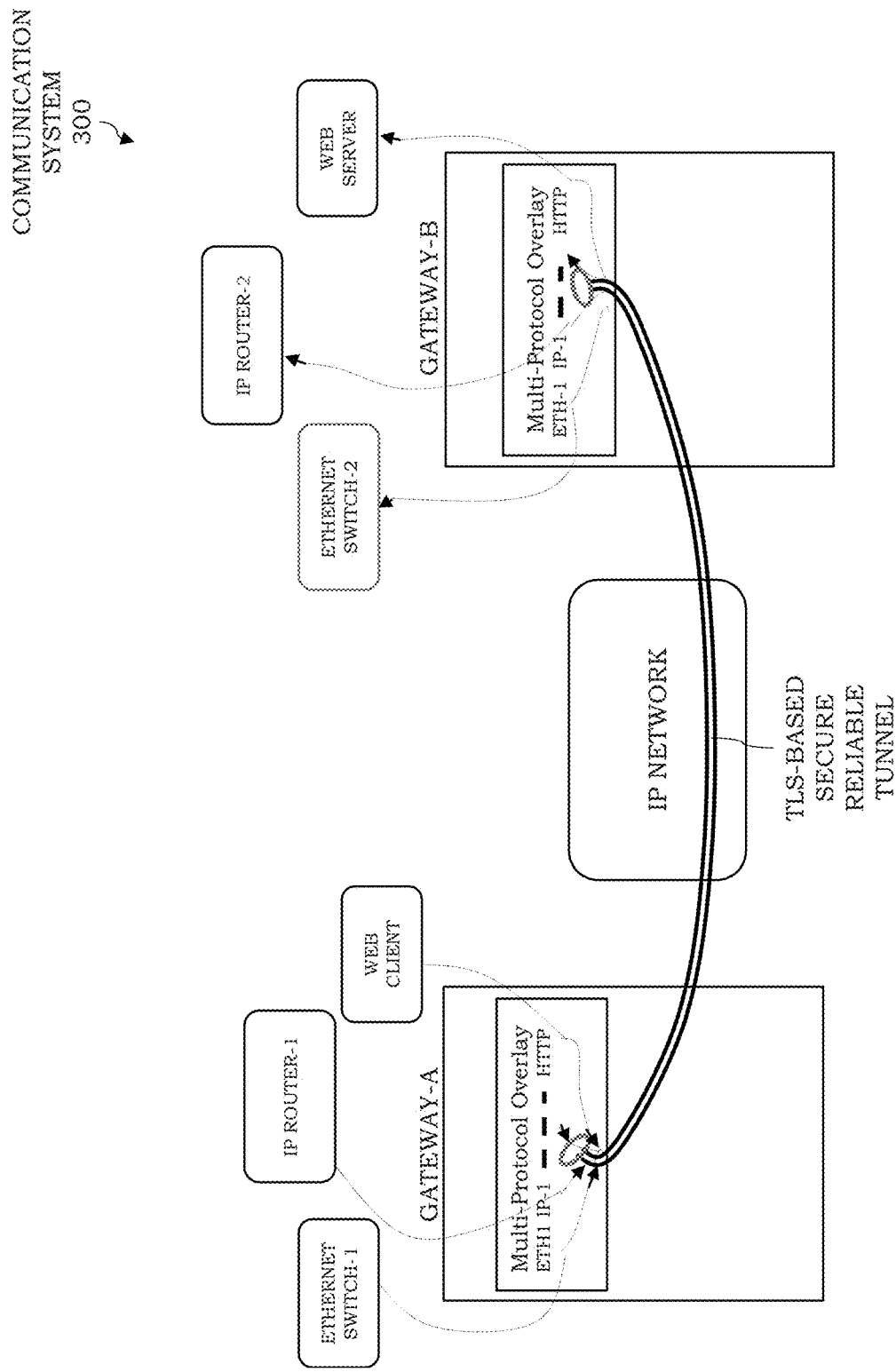
FIG. 3 depicts an example embodiment of a communication system configured to support tunneling of multiple communication protocols, at one or more communication protocol layers, over a TLS session.

It will be appreciated that various example embodiments presented herein, including example embodiments for supporting tunneling of any communication protocol at any communication protocol layer over a TLS session and example embodiments for supporting multiplexing of multiple data streams (e.g., at one or more communication protocol layers) over a single TLS session, may be further understood by considering examples of communication systems in which such example embodiments may be applied, such as the example communication systems presented in FIGS. 2 and 3.

FIG. 2 depicts an example embodiment of a communication system configured to support tunneling of any communication protocol, at any communication protocol layer, over a TLS session. It will be appreciated that the communication system 200 of FIG. 1 corresponds to the example of box 101 of FIG. 1. The Gateways of the communication system 200 (illustratively, Gateway-A and Gateway-B) each may be provided using the communication device 100 of FIG. 1. The Gateways of the communication system 200 have a TLS-based secure reliable tunnel therebetween (e.g., established based on MLPN and supporting communication of data based on TLS MP Records) over an underlying IP network. The Gateways are interconnected by an IP network. Gateway-A and Gateway-B provide secured and reliable interconnects for independent private networks or applications, wherein the private networks or applications may operate at any communication protocol layer. Since the Gateways are not adjacent to each other, the Gateways multiplex and tunnel the packets of the private networks or applications over a TLS session among the gateways. The TLS session provides secured and reliable delivery of the packets in the private networks or applications. The capability of the Gateways to support tunneling of any communication protocol, at any communication protocol layer, over the TLS-based secure reliable tunnel is represented by the Any-Protocol Overlay elements supported by the Gateways, respectively. As in the example of box 101 of FIG. 1, the TLS-based secure reliable tunnel supports communication of a data stream of any communication protocol, at any communication protocol layer, and, thus, the endpoints of the data stream are indicated as endpoint-A (associated with Gateway-A) and endpoint-B (associated with Gateway-B).

FIG. 3 depicts an example embodiment of a communication system configured to support tunneling of multiple communication protocols, at one or more communication protocol layers, over a TLS session. It will be appreciated that the communication system 300 of FIG. 3 corresponds to the example of box 102 of FIG. 1. The Gateways of the communication system 300 (illustratively, Gateway-A and Gateway-B) each may be provided using the communication device 100 of FIG. 1. The Gateways of the communication system 300 have a TLS-based secure reliable tunnel therebetween (e.g., established based on MLPN and supporting communication of data based on TLS MP Records) over an underlying IP network. The Gateways are interconnected by an IP network. Gateway-A and Gateway-B provide secured and reliable interconnects for independent private networks or applications, wherein the private networks or applications may operate at any communication protocol layer. Since the Gateways are not adjacent to each other, the Gateways multiplex and tunnel the packets of the private networks or applications over a TLS session among the gateways. The TLS session provides secured and reliable delivery of the packets in the private networks or applications. The capability of the Gateways to support tunneling of multiple communication protocols, at one or more communication protocol layers, over a TLS session is represented by the Multi-Protocol Overlay elements supported by the Gateways, respectively. As in the example of box 102 of FIG. 1, the TLS-based secure reliable tunnel supports multiplexing of data streams of two Ethernet (data link layer) overlay networks (labeled ETH1 and ETH2), two IP (network layer) networks (labeled IP1 and IP2), one HTTP based application (labeled HTTP), and one SMTP based application (labeled SMTP) over a single TLS session (although, for purposes of clarity, only the ETH1 data stream between a pair of Ethernet switches, the IP1 data stream between a pair of IP routers, and the HTTP data stream between a web server and a web client are illustrated in FIG. 3).

As described herein, support of communication protocol layers and specific communication protocols within each communication protocol layer may be negotiated by the endpoints of the TLS session during the TLS handshake procedure. The TLS protocol is configured to support a TLS extension, referred to herein as a Multi-Layer Protocol Negotiation (MLPN) extension, for use by the endpoints of the TLS session in negotiating use of any communication protocol(s) at any communication protocol layer(s), which may include negotiating use of a single communication protocol at a communication protocol layer below the session layer, negotiating use of multiple communication protocols at multiple communication protocol layers (which may include multiple communication protocol layers that include the application layer and one or more communication protocol layers below the session layer, multiple communication protocol layers below the session layer, or the like), and so forth. The MLPN extension may be supported within the TLS protocol by supporting new extension types ("multi_layer_protocol_negotiation" extension types) which may be exchanged between the client and the server in the TLS handshake (e.g., included by the client in its ClientHello message in the TLS handshake and processed by the server upon receiving the ClientHello message from the client in the TLS Handshake, included by the server in its ServerHello message in the TLS handshake and processed by the client upon receiving the SeverHello, and so forth). A definition of the MLPN extension is presented in FIG. 4.

FIG. 4 depicts an example embodiment of a definition of an MLPN extension for use by endpoints in a TLS handshake.

As depicted in FIG. 4, the MLPN extension 400 enables encoding of each of the communication protocol layers supported by an endpoint and, for each of the communication protocol layers, supported by the endpoint, a prioritized list of the communication protocols supported by the endpoint at that communication protocol layer. The communication protocol layers supported by the endpoint may be encoded using layer name values (e.g., specified in the MLPN using LayerName) and the communication protocols supported by the endpoint may be encoded using protocol identification values (e.g., specified in the MLPN using ProtocolList).

The "LayerName" includes the name of the communication protocol layer. The communication protocol layers may be named by opaque, non-empty byte strings. Empty strings are not included and byte strings are not truncated. It will be appreciated that the communication protocol layers may be indicated within the MLPN in various ways. For example, the following communication protocol layer names may be used: (1) Data Link Layer="dlink", (2) Network Layer="network", (3) Transport Layer="transport", (4) Application Layer protocols with standardized TCP ports="app/tcp", (5) Application Layer protocols with standardized SCTP ports="app/sctp", and (6) Application layer protocols with standardized UDP ports="app/udp". It will be appreciated that the communication protocol layers may be indicated within the MLPN in various other ways.

The "ProtocolList" includes a list of 16-bit values, wherein each value identifies a communication protocol. The value of the communication protocols is dependent on the layer for which the ProtocolList is applicable. For example, the following layer-wise protocol values of communication protocols may be used. For example, for the Data Link Layer (e.g., LayerName="dlink"), the following protocol values may be used (although it will be appreciated that other suitable values may be used): (1) Ethernet=1, (2) PPP=2, (3) HDLC=3, (4) IEEE 802.11 wireless LAN=4, (5) LLDP=5, and (6) Frame Relay=6. For example, for the Network Layer (e.g., LayerName="network"), the standardized Ethertype values may be used as the protocol values such that network layer protocols are automatically applicable in the MLPN extension 400 (although it will be appreciated that other suitable values may be used). For example, for the Transport Layer (e.g., LayerName="transport"), the standardized Protocol Type values used by IP headers may be used such that transport layer protocols are automatically applicable in the MLPN extension 400. It will be appreciated that the communication protocols may be indicated within the MLPN in various other ways.

It will be appreciated that, although primarily presented with respect to example embodiments in which the communication protocol layers and associated communication protocols supported by an endpoint are encoded within the MLPN as tuples of {LayerName, ProtocolList} (e.g., as tuples where the LayerName indicates the values used to indicate communication protocols in the ProtocolList and, thus, protocol values in the ProtocolList may be reused across different LayerName values), the communication protocol layers and associated communication protocols supported by an endpoint may be encoded within the MLPN in other ways.

For example, the communication protocol layers and associated communication protocols supported by an endpoint may be encoded within the MLPN using a list of values representing communication protocol layers supported by the endpoint and a list of values representing communication protocols supported by the endpoint, such that each communication protocol is assigned a unique value across communication protocol layers.

For example, the communication protocol layers and associated communication protocols supported by an endpoint may be encoded within the MLPN using a list of values representing communication protocols supported by the endpoint, such that each communication protocol is assigned a unique value across communication protocol layers by encoding the value with two fields wherein the first field is the value assigned to a layer and the second field is the value assigned to a protocol within that layer. For example, the communication protocol layers and associated communication protocols supported by an endpoint may be encoded within the MLPN by encoding a communication protocol with a 32-bit value where the upper 16 bits indicate the value assigned to the communication protocol layer and the lower 16 bits indicate the value of the communication protocol within that communication protocol layer. For example, the upper 16 bit values may be defined as follows: 1=data link, 2=network, 3=transport, 4=applications based on TCP, and so forth (or using any other suitable values). Based on this mapping of the upper 16 bit values, various communication protocols may be encoded as follows: MPLS may be encoded as 2:0x8847 (network layer:Ethertype of MPLS), IPv4 may be encoded as 2:0x800 (network layer:Ethertype of IPv4), HTTP may be encoded as 4:0x50 (application based on TCP:HTTP port for TCP), and so forth. It will be appreciated that, using this type of encoding, all that is needed to encode the communication protocol layer and the communication protocol is a single list of communication protocols where each 32-bit value uniquely identifies a communication protocol within a communication protocol layer.

It will be appreciated that the communication protocol layers and associated communication protocols supported by an endpoint may be encoded within the MLPN in various other ways.

As described herein, the extension type ("multi_layer_protocol_negotiation(20)") may be exchanged between the client and the server in the TLS handshake. A new ClientHello extension type ("multi_layer_protocol_negotiation (20)") may be included by the client in its ClientHello message in the TLS handshake and processed by the server upon receiving the ClientHello message from the client in the TLS Handshake. The server, upon receiving the ClientHello including the "multi_layer_protocol_negotiation" extension, may return a suitable protocol selection response to the client. The server will ignore any communication protocol that it does not recognize. A new ServerHello extension type ("multi_layer_protocol_negotiation(16)") may be returned to the client within the extended ServerHello message. The "extension_data" field of the ("multi_layer_protocol_negotiation(16)") extension may be structured the same as for the client "extension_data". The "MultiLayerProtocolList" includes the communication protocols selected by the server. It is noted that a full handshake with the "multi_layer_protocol_negotiation" extension in the ClientHello and ServerHello messages has a flow as presented in FIG. 5 and an abbreviated handshake with the "multi_layer_protocol_negotiation" extension has a flow as presented in FIG. 6.

Figure 5:
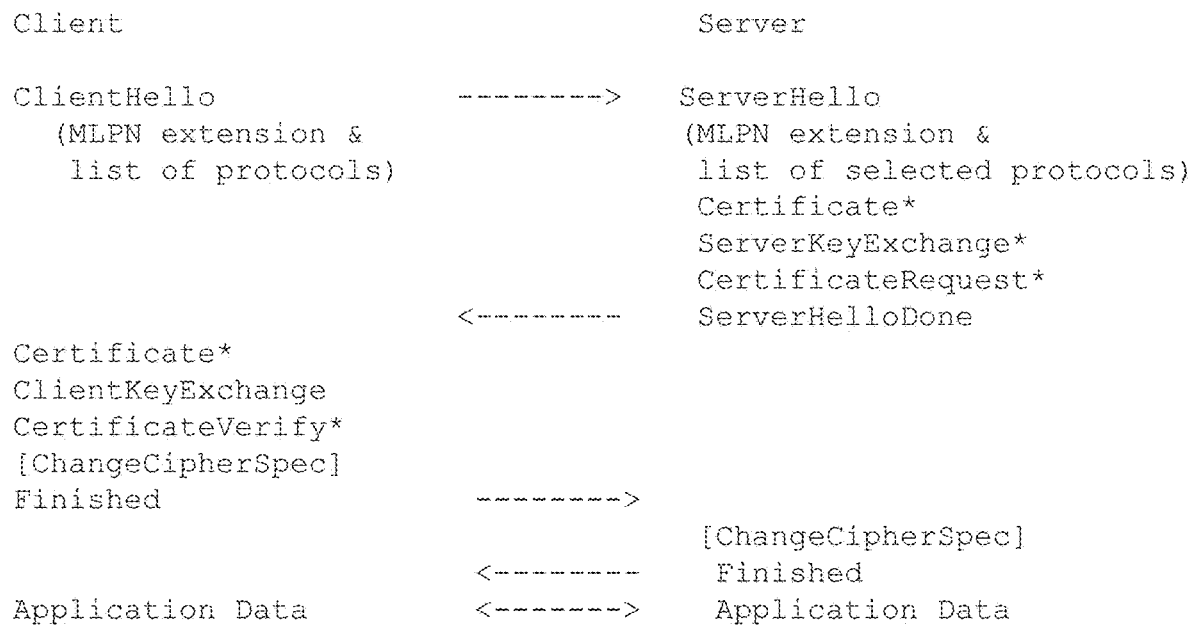
FIG. 5 depicts an example embodiment of a full TLS handshake between a client and a server using an MLPN extension.

FIG. 5 depicts an example embodiment of a full TLS handshake between a client and a server using an MLPN extension. In the full TLS handshake 500, the client sends a list of protocols supported by the client to the server, the server sends a list of protocols supported by the server to the client, and the client selects the communication protocols to be supported on the TLS session between the client and the server. The client selects the communication protocols to be supported on the TLS session based on the list of protocols supported by the client and the list of protocols supported by the server.

Figure 6:
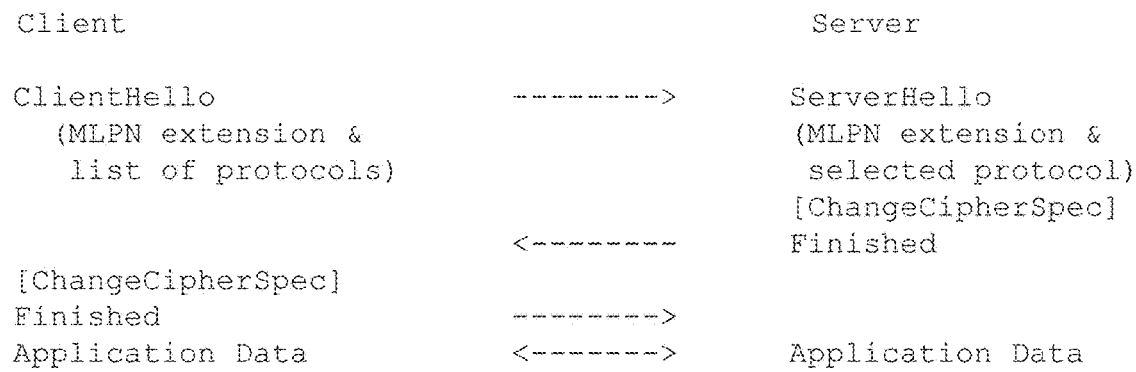
FIG. 6 depicts an example embodiment of an abbreviated TLS handshake between a client and a server using an MLPN extension.

FIG. 6 depicts an example embodiment of an abbreviated TLS handshake between a client and a server using an MLPN extension. In the abbreviated TLS handshake 600, the client sends a list of protocols supported by the client to the server, the server selects the communication protocols to be supported on the TLS session between the client and the server, and the server responds to the client with an indication of the communication protocols to be supported on the TLS session between the client and the server. The server selects the communication protocols to be supported on the TLS session based on the list of protocols supported by the client and the list of protocols supported by the server.

It will be appreciated that, unlike many other TLS extensions, the MLPN extension may not establish properties of the connection and not the session such that, when session resumption or session tickets are used, the previous contents of the MLPN extension are irrelevant and only the values in the new handshake messages are considered.

As described herein, the client and server may be configured to negotiate communication protocol(s) of communication protocol layer(s) based on use of the MLPN extension during the TLS handshake. Example embodiments of methods for use by a client and a server for MLPN during a TLS handshake are presented with respect to FIGS. 7 and 8, respectively.

Figure 7:
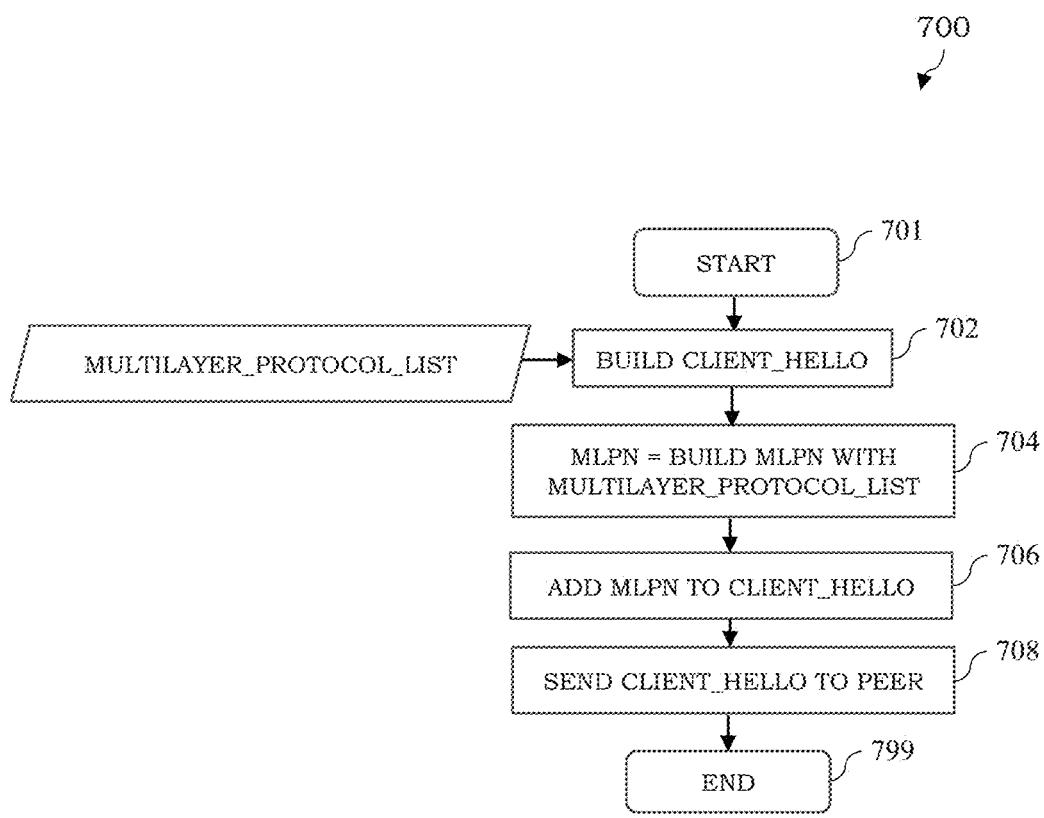
FIG. 7 depicts an example embodiment of a method for use by a client for MLPN during an TLS handshake.

FIG. 7 depicts an example embodiment of a method for use by a client for MLPN during a TLS handshake. It will be appreciated that, although primarily presented as being performed serially, at least a portion of the functions of method 700 may be performed contemporaneously or in a different order than as presented with respect to FIG. 7. At block 701, method 700 begins. As indicated in FIG. 7, the input to the method 700 is the set of layers supported by the endpoint and, for each of the layers supported by the endpoint, the set of protocols supported by the endpoint. This input may be provided in the format of MultiLayerProtocolList. Block 702 builds the ClientHello for the TLS session using procedures in the TLS specification, and then the method 700 proceeds to block 704. Block 704 builds an MLPN extension with the MultiLayerProtocolList, and then the method 700 proceeds to block 706. Block 706 adds the MLPN extension to the ClientHello, and then the method 700 proceeds to block 708. Block 708 sends the ClientHello to the server (e.g., via TCP→IP), and then the method 700 proceeds to block 799. At block 799, the method 700 ends.

Figure 8:
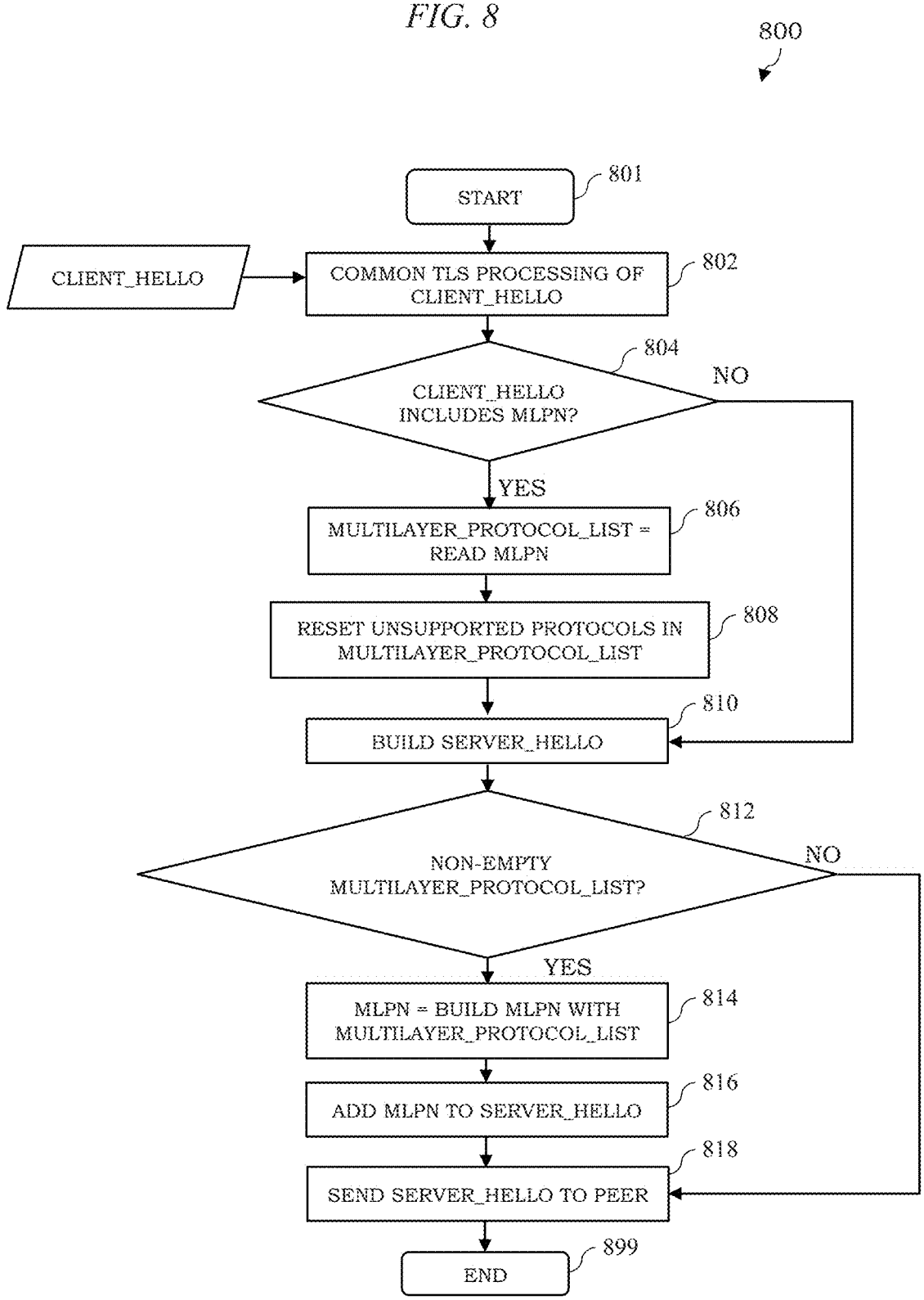
FIG. 8 depicts an example embodiment of a method for use by a server for MLPN during an TLS handshake.

FIG. 8 depicts an example embodiment of a method for use by a server for MLPN during an TLS handshake. It will be appreciated that, although primarily presented as being performed serially, at least a portion of the functions of method 800 may be performed contemporaneously or in a different order than as presented with respect to FIG. 8. At block 801, method 800 begins. As indicated in FIG. 8, the input to the method 800 is a ClientHello received from a peer. Block 802 performs processing of the ClientHello using procedures in the TLS specification, and then the method 800 proceeds to block 804. Block 804 checks if the ClientHello includes the MLPN extension. If the ClientHello includes the MLPN extension, then the method 800 proceeds to block 806. If the ClientHello does not include the MLPN extension, the method 800 proceeds to block 810. Block 806 reads the MultiLayerProtocolList in the MLPN extension, and then the method 800 proceeds to block 808. Block 808 resets the communication protocols in MultiLayerProtocolList that are not supported by the server, and then the method 800 proceeds to block 810. Block 810 builds a ServerHello using procedures in the TLS specification, and then the method 800 proceeds to block 812. Block 812 checks if the MutiLayerProtocolList is non-empty (if the server supports none of the communication protocols, then it will be made empty by block 808). If the MutiLayerProtocolList is non-empty, then the method 800 proceeds to block 814. If the MutiLayerProtocolList is empty, then the method 800 proceeds to block 818. Block 814 builds a MLPN extension from MultiLayerProtocolList, and then the method proceeds to block 816. Block 816 adds the MLPN extension to ServerHello, and then the method 800 proceeds to block 818. Block 818 sends the ServerHello to the client (e.g., via TCP→IP), and then the method 800 proceeds to block 899. At block 899, the method 800 ends.

As described herein, the basic structure of the TLS MP Record is the same as the TLS Record in the TLS specification, but uses a new value for the Content Type field and includes a sequence of TLS MP Frames. The new value for the "Content Type" field, which may be referred to using the term "multi_layer_data" and which may be assigned a value suitable for indicating that the TLS Record is a TLS MP Record (e.g., a value reserved in the TLS ContentType registry (e.g., a value of 26 or any other suitable value) or other suitable value). The sequence of TLS MP Frames may be included in the Payload field of TLS MP Record. Example embodiments of a TLS MP Record and a Payload of a TLS MP Record are presented in FIG. 9.

FIG. 9 depicts an example embodiment of a TLS MP Record and a Payload of a TLS MP Record.

As depicted in FIG. 9, the TLS MP Record 900 includes a Content Type field, a Version field, a Length field, a Payload field, and MAC field, and, optionally, a Padding field. The "Content Type" field, which may be referred to using the term "multi_layer_data", may be assigned a value suitable for indicating that the TLS Record is a TLS MP Record (e.g., a value reserved in the TLS ContentType registry (e.g., a value of 26 or any other suitable value) or other suitable value). The Payload field includes a set of TLS MP Frames (denoted as TLS MP Frame 1 through TLS MP Frame N). The format of each TLS MP Frame is discussed further below.

As described herein, each TLS MP Frame carries a stream being multiplexed over the TLS session. The payload of the TLS MP frame is the packet of the respective protocol associated with the stream. An example embodiment of a TLS MP Frame is presented in FIG. 10.

FIG. 10 depicts an example embodiment of a TLS MP Frame configured to support transport of data.

As depicted in FIG. 10, the TLS MP Frame 1000 begins with a 10-octet header followed by the payload (Stream Data). The TLS MP Frame includes a Layer Type field, a Flags field, a Protocol ID field, a Stream ID field, a Length Field, an Offset field, and a Stream Data field. A description of the fields of the TLS MP Frame 1000 follows.

Layer Type: This 8-bit field indicates the layer of protocol packet carried in the frame. For example, the following values may be used: (1) 0x01=Data Link Layer, (2) 0x02=Network Layer, (3) 0x03=Transport Layer (it is noted that this also includes any non-transport protocols that run over the Network Layer), (4) 0x04=Application Layer with TCP ports (which means it includes all application layer protocols that have standardized TCP port numbers), (5) 0x05=Application Layer with UDP ports (which means it includes all application layer protocols that have standardized TCP port numbers), and (6) 0x06=Application Layer with SCTP ports (which means it includes all application layer protocols that have standardized TCP port numbers). It will be appreciated that various other suitable values may be used to represent the layer type.

Flags: This 8-bit flags field may be used to support various functions. For example, the first bit position may be defined as the FIN-bit which indicates the end of a stream, and the remaining seven bit positions may be reserved for future use (e.g., the Sender will set the bits 2-8 to 0 and the receiver will ignore those bits).

Protocol ID: This 16-bit field indicates the communication protocol within the Layer Type. The values are dependent on the Layer Type field.

For example, when the Layer Type is Data Link Layer (0x01), then the values in the Protocol ID field may be defined as follows: Ethernet=1, PPP=2, HDLC=3, IEEE 802.11 wireless LAN=4, LLDP=5, Frame Relay=6. It will be appreciated that data link layer protocols not included in the above list may be assigned values in the range 7-65535. It will be appreciated that the values may be assigned to the data link layer protocols in various other ways, other types of values may be used to indicate data link layer protocols, or the like, as well as various combinations thereof.

For example, when the Layer Type is Network Layer (0x02), then the values in the Protocol ID field may be set according to the standardized values for Ethertypes (e.g., in the IEEE 802 Numbers Registry in IANA). It will be appreciated that the values may be assigned to the network layer protocols in various other ways, other types of values may be used to indicate network layer protocols, or the like, as well as various combinations thereof.

For example, when the Layer Type is Transport Layer (0x03), then the values in the Protocol ID field may be set according to the standardized values for Internet Protocol Numbers (e.g., in the Assigned Internet Protocol Numbers Registry in IANA). It will be appreciated that the values may be assigned to the transport layer protocols in various other ways, other types of values may be used to indicate transport layer protocols, or the like, as well as various combinations thereof.

Stream ID: This 16-bit field caries the Stream ID of the stream being transported on the frame. The value 0 is invalid. A TLS session can support up to 65535 Stream IDs.

Length: This 16-bit field carries the length of the Stream Data. The length is specified in the number of bytes.

Offset: This field is applicable when the communication protocol carried by the stream is a datagram oriented protocol (e.g., Ethernet, IP, and so forth). If the value is 0, it means that Stream Data starts with the beginning of a datagram (i.e., the header of the protocol packet). If the value is non-zero, then it means that the Stream Data carries a fragment of the protocol packet and the value is the offset of the fragment in the original protocol packet.

Stream Data: This variable length field includes the bytes from the designated stream to be delivered. If the Offset is 0 then, as indicated above, the stream data starts with the beginning of a datagram (e.g., an Ethernet Header in the case of an Ethernet Packet, an IP Header in the case of an IPv4 packet, and so forth).

It will be appreciated that the TLS MP Frame 1000 may be configured in various other ways (e.g., using different sizes for the fields, a different arrangement of the fields, fewer or more fields, different fields, or the like, as well as various combinations thereof).

Figure 11:
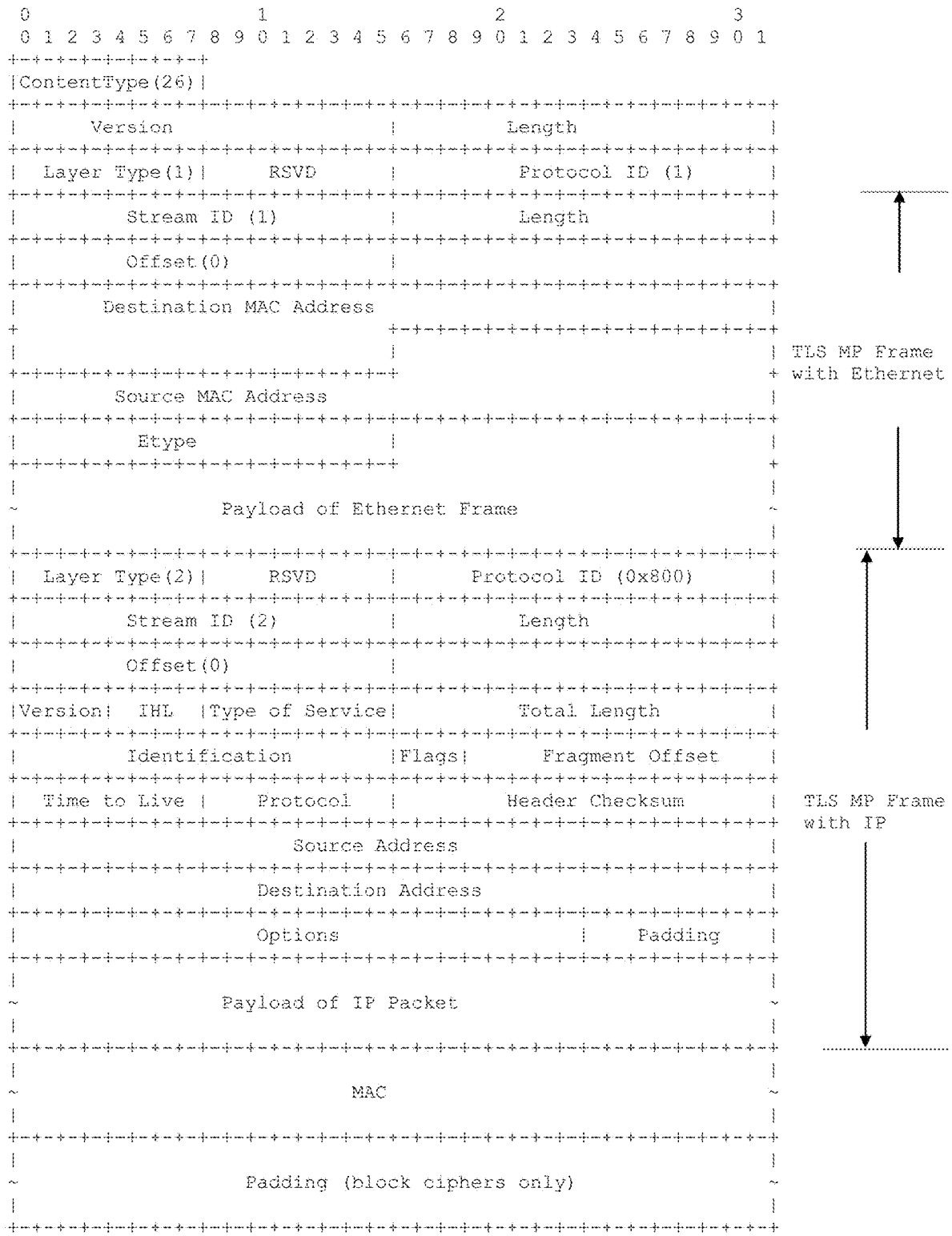
FIG. 11 depicts an example encoding of a TLS MP Record that multiplexes and tunnels an Ethernet frame and an IP packet.

FIG. 11 depicts an example encoding of a TLS MP Record that multiplexes and tunnels an Ethernet frame and an IP packet. The TLS MP Record 1100 has a format similar to the format of the TLS MP Record 900 of FIG. 9, including a Content Type field (configured to indicate that that the Record is a TLS MP Record as opposed to a regular TLS Record), a Version field, a Length field, a Payload field, and MAC field, and, optionally, a Padding field. The payload field includes the Ethernet frame encoded as a TLS MP Frame and the IP packet encoded as a TLS MP Frame, each of which has a format similar to the format of the TLS MP Frame 1000 of FIG. 10. In the first TLS MP Frame of the Payload of the TLS MP Record, the Layer Type and Protocol ID fields are configured with values indicative that the TLS MP Frame includes an Ethernet frame, thereby enabling the peer that receives the TLS MP Record 1100 to identify the Ethernet frame within the TLS MP Record and extract the Ethernet frame from the TLS MP Record for processing (e.g., based on the indication that the TLS MP Frame includes an Ethernet frame, then the receiving peer can determine the length of the Ethernet frame, the sizes of each of the fields of the Ethernet frame, and so forth). In the second TLS MP Frame of the Payload of the TLS MP Record, the Layer Type and Protocol ID fields are configured with values indicative that the TLS MP Frame includes an IP packet, thereby enabling the peer that receives the TLS MP Record 1100 to identify the IP packet within the TLS MP Record and extract the Ethernet frame from the TLS MP Record for processing (e.g., based on the indication that the TLS MP Frame includes an IP packet, then the receiving peer can determine the length of the IP packet, the sizes of each of the fields of the IP packet, and so forth). The Ethernet frame belongs to an overlay with Stream ID 1 and the IP packet belongs to an overlay with Stream ID 2.

As described herein, streams in TLS provide a lightweight, ordered datagram or byte-stream application to a protocol. Streams can be unidirectional or bi-directional. Streams can be created by sending data on a stream. A stream can be terminated by setting the FIN-bit on the stream (e.g., in the TLS MP Frame of the stream). In other words, a single TLS MP frame can open, carry data for, and close a stream; this approach is adopted to impose minimal overhead on management of streams. Streams can also be long-lived and can last the entire duration of a TLS session. An endpoint that initiates a stream independently allocates the Stream ID to be used for the stream. To eliminate conflicts in Stream ID allocation between the endpoints, client-initiated streams have even-numbered Stream IDs and server-initiated streams have odd-numbered Stream IDs (although it will be appreciated that other mechanisms may be used to eliminate conflicts in Stream IDs). Example embodiments for allocating and releasing Stream IDs are presented with respect to FIGS. 12 and 13, respectively. Example embodiments for sending and receiving data over streams based on Stream IDs are presented with respect to FIGS. 14 and 15, respectively.

Figure 12:
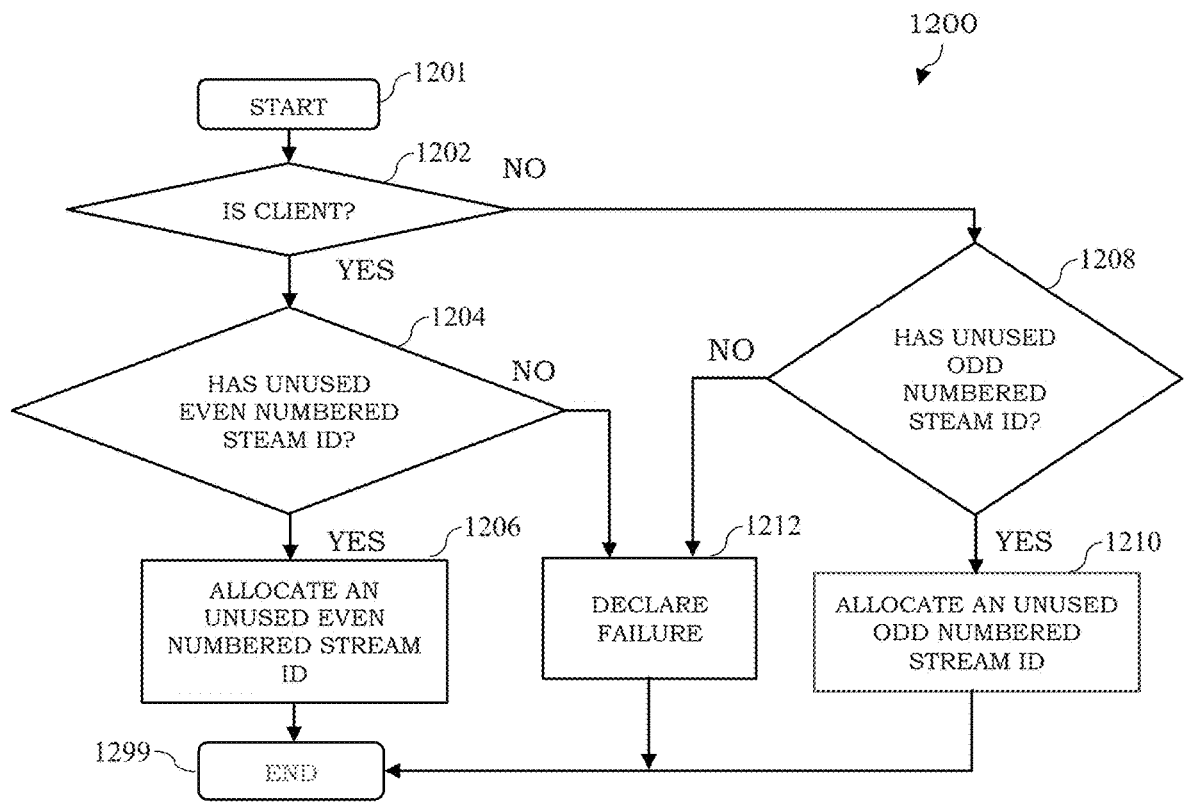
FIG. 12 depicts an example embodiment of a method for use by a communication device to allocate a Stream ID.

FIG. 12 depicts an example embodiment of a method for use by a communication device to allocate a Stream ID. It will be appreciated that, although primarily presented as being performed serially, at least a portion of the functions of method 1200 may be performed contemporaneously or in a different order than as presented with respect to FIG. 12.

At block 1201, method 1200 begins. Block 1202 checks if the endpoint is the client for the TLS session or the server for the TLS session. If the endpoint is the client for the TLS session, then the method 1200 proceeds to block 1204. If the endpoint is the server for the TLS session, then the method 1200 proceeds to block 1208. Block 1204 checks if there is at least one unused even-numbered Stream ID available in the range of 1-65535. If no unused even-numbered Stream IDs are available in the range of 1-65535, then the method 1200 proceeds to block 1212, at which point a failure is declared, and the method 1200 then proceeds to block 1299 where the method 1200 ends. If at least one unused even-numbered Stream ID is available in the range of 1-65535, then the method proceeds to block 1206. Block 1206 allocates an unused even-numbered Stream ID, and the method 1200 then proceeds to block 1299 where the method 1200 ends. Block 1208 checks if there is at least one unused odd-numbered Stream ID available in the range of 1-65535. If no unused odd-numbered Stream IDs are available in the range of 1-65535, then the method 1200 proceeds to block 1212, at which point a failure is declared, and the method 1200 then proceeds to block 1299 where the method 1200 ends. If at least one unused odd-numbered Stream ID is available in the range of 1-65535, then the method proceeds to block 1210. Block 1210 allocates an unused odd-numbered Stream ID, and the method 1200 then proceeds to block 1299 where the method 1200 ends. At block 1299, the method 1200 ends.

Figure 13:
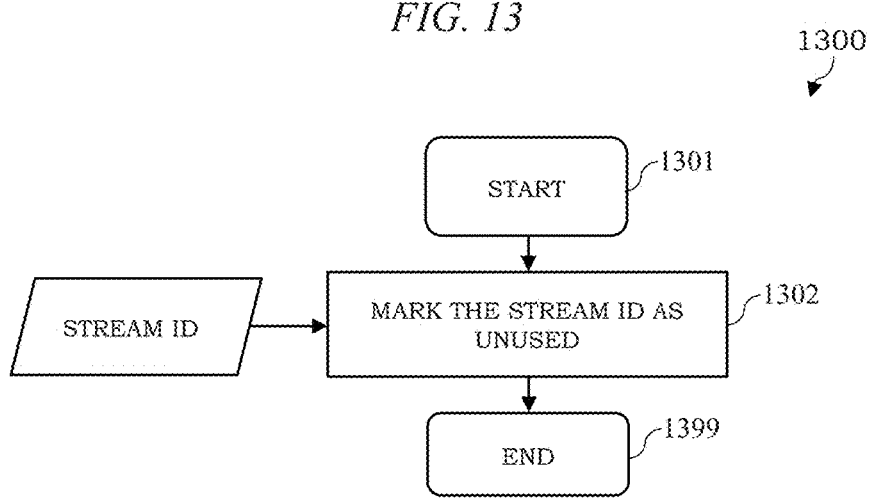
FIG. 13 depicts an example embodiment of a method for use by a communication device to release a Stream ID.

FIG. 13 depicts an example embodiment of a method for use by a communication device to release a Stream ID. It will be appreciated that, although primarily presented as being performed serially, at least a portion of the functions of method 1300 may be performed contemporaneously or in a different order than as presented with respect to FIG. 13. At block 1301, method 1300 begins. As indicated in FIG. 13, the input to the method 1300 is the Stream ID to be released. Block 1302 marks the Stream ID as unused and releases it to the Stream ID space managed by the endpoint for the TLS session. At block 1399, method 1300 ends.

As described herein, endpoints are configured to support sending and receiving of multiprotocol data based on use of TLS MP Records including TLS MP Frames. Example embodiments are presented with respect to FIGS. 14 and 15.

As described herein, an endpoint that needs to send multi-protocol data to a peer may create a TLS MP Record including TLS MP Frames and send the TLS MP Record to the peer. TLS MP frames encapsulate data sent by a user protocol, and the endpoint uses the Stream ID and Offset fields in TLS MP Frames to place data in order within the TLS MP Record. An example embodiment of a method for use by an endpoint that creates a TLS MP Records including one or more TLS MP Frames and sends the TLS MP Record to a peer is presented in FIG. 14.

Figure 14:
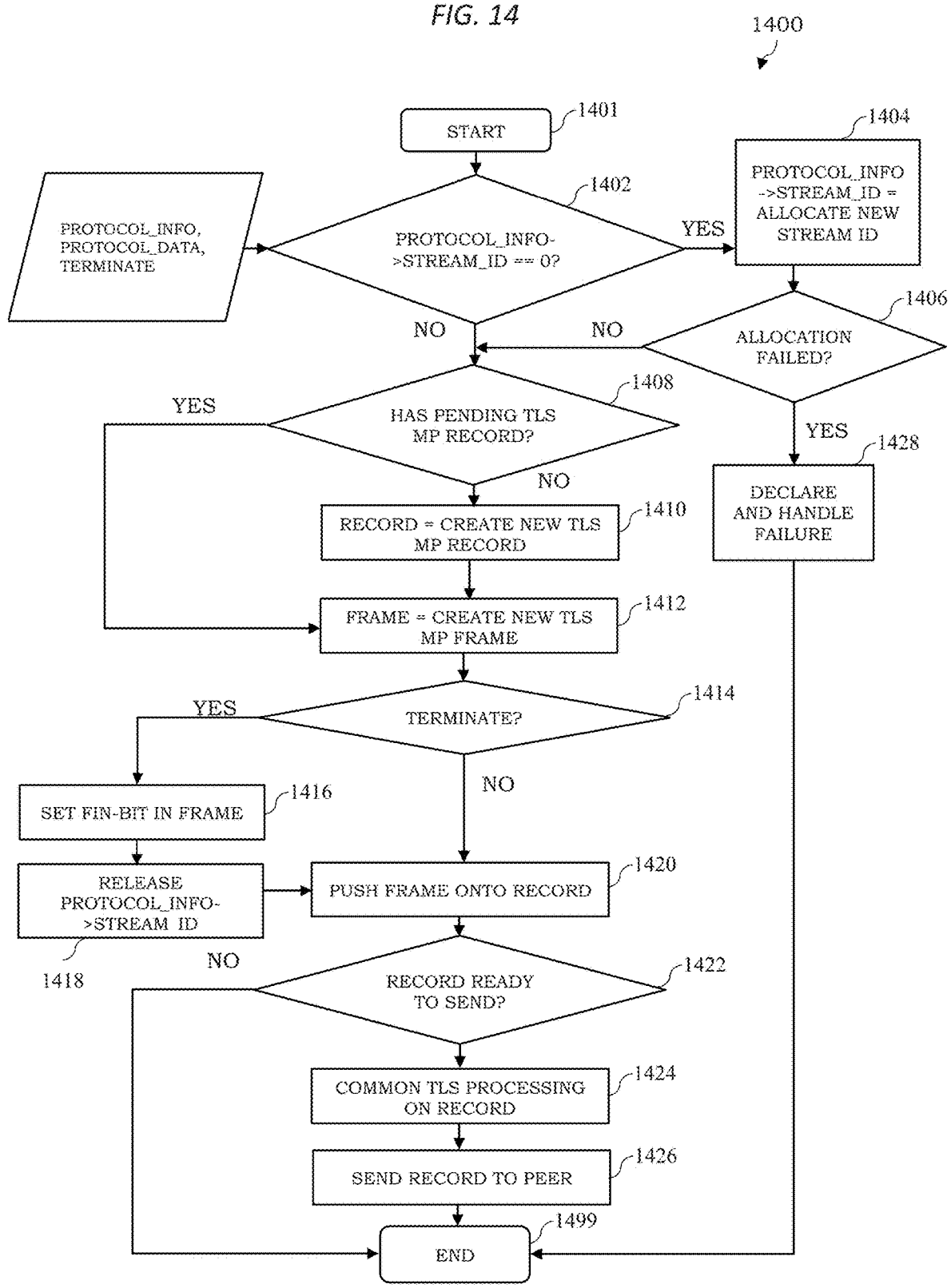
FIG. 14 depicts an example embodiment of a method for use by a communication device to send multi-protocol data to a peer.

FIG. 14 depicts an example embodiment of a method for use by a communication device to send multi-protocol data to a peer. It will be appreciated that, although primarily presented as being performed serially, at least a portion of the functions of method 1400 may be performed contemporaneously or in a different order than as presented with respect to FIG. 14. At block 1401, method 1400 begins. As indicated in FIG. 14, the inputs to the method 1400 include: Protocol_Info (which include the Stream ID, Layer Type, and Protocol ID for which the packet is being sent where it is noted that, if this is the first packet for the stream, then the Stream ID is not allocated may be input as zero), Protocol_Data (which is the packet/payload of the protocol to be sent), and Terminate (which is a boolean which, if set to TRUE, means that the stream needs to be terminated after sending this packet). Block 1402 checks if the Stream ID provided in Protocol_Info is zero (i.e., if this is the first packet for the stream). If the Stream ID provided in Protocol_Info is zero, then the method 1400 proceeds to block 1404. If the Stream ID provided in Protocol_Info is not zero, then the method 1400 proceeds to 1408. Block 1404 allocates a new Stream ID and creates state for the stream such that the stream maps to the Protocol_Info. The allocation of the Stream ID at block 1404 may implemented by the method 1200 of FIG. 12. The method 1400 then proceeds to block 1406. Block 1406 checks if Stream ID allocation failed in block 1404. If Stream ID allocation failed, then the method 1400 proceeds to block 1428, which declares the failure to send the packet and performs required actions and then proceeds to block 1499 where the method 1400 ends. If the Stream ID allocation did not fail, then the method 1400 proceeds to block 1408. Block 1408 checks if there is a TLS MP Record pending to be sent to the peer. It is noted that an implementation may not send a TLS MP Record immediately if the optimum size is not filled, and may wait for a certain period of time to see if more Protocol_Data arrives. If there is a TLS MP Record pending to be sent to the peer, then the method 1400 proceeds to block 1410. If there is a TLS MP Record pending to be sent to the peer, then the method 1400 proceeds to block 1412. Block 1410 creates a new TLS MP Record, and then the method 1400 proceeds to block 1412. Block 1412 creates a new TLS MP Frame to carry the Protocol Data, with the Layer Type and Protocol ID in the TLS MP Frame being set to the respective values in Protocol Info, and then the method 1400 proceeds to block 1414. Block 1414 checks if the stream needs to be terminated after sending the TLS MP Frame. If the stream needs to be terminated after sending the TLS MP Frame, then the method 1400 proceeds to block 1416. If the stream does not need to be terminated after sending the TLS MP Frame, then the method proceeds to block 1420. Block 1416 sets the FIN-bit in TLS MP Frame to indicate termination of the stream, and then the method 1400 proceeds to block 1418. Block 1418 releases the Stream ID. The release of the Stream ID at block 1418 may be implemented by the method 1300 of FIG. 13. The method 1400 then proceeds to block 1420. Block 1420 pushes the TLS MP Frame onto the TLS MP Record, and then the method 1400 proceeds to block 1422. Block 1422 checks if the TLS MP Record is ready to be sent (e.g., based on the conditions described during block 1408). If the TLS MP Record is not yet ready to be sent, then the method 1400 proceeds to block 1499 where the method 1400 ends. If the TLS MP Record is ready to be sent, then the method 1400 proceeds to block 1424. Block 1424 performs various actions on the TLS MP Record (e.g., as defined by the TLS specification), such an encryption, addition of authentication data, and the like), and then the method proceeds to block 1426. Block 1426 sends the TLS MP Record to peer and then the method proceeds to block 1499 where the method 1400 terminates. It will be appreciated that, although omitted from the method 1400 for simplicity, the method 1400 may be configured to support fragmentation of Protocol_Data (e.g., into multiple TLS MP Frames, wherein each frame is sent in subsequent TLS MP Records) if a condition arises which causes fragmentation of Protocol_Data.

As described herein, an endpoint that receives the TLS MP Record from peer processes each TLS MP Frame in the TLS MP Record. If the stream for the Stream ID in a TLS MP frame is not yet setup, then the endpoint sets up the stream with the Stream ID and marks the Stream ID to be owned by the peer (so only peer can terminate the stream). Additionally, the Layer Type and Protocol ID in the TLS MP Frame are associated with the Stream ID as the user protocol. If the stream for the Stream ID in a TLS MP frame exists, then the endpoint verifies that the Layer Type and Protocol ID in the TLS MP Frame is consistent with the user protocol of the stream. Then, the endpoint reads out the stream data from the TLS MP Frame and provides the stream data to the user protocol. An example embodiment of a method for use by an endpoint that receives the TLS MP Record from peer and processes each TLS MP Frame in the TLS MP Record is presented in FIG. 15.

Figure 15:
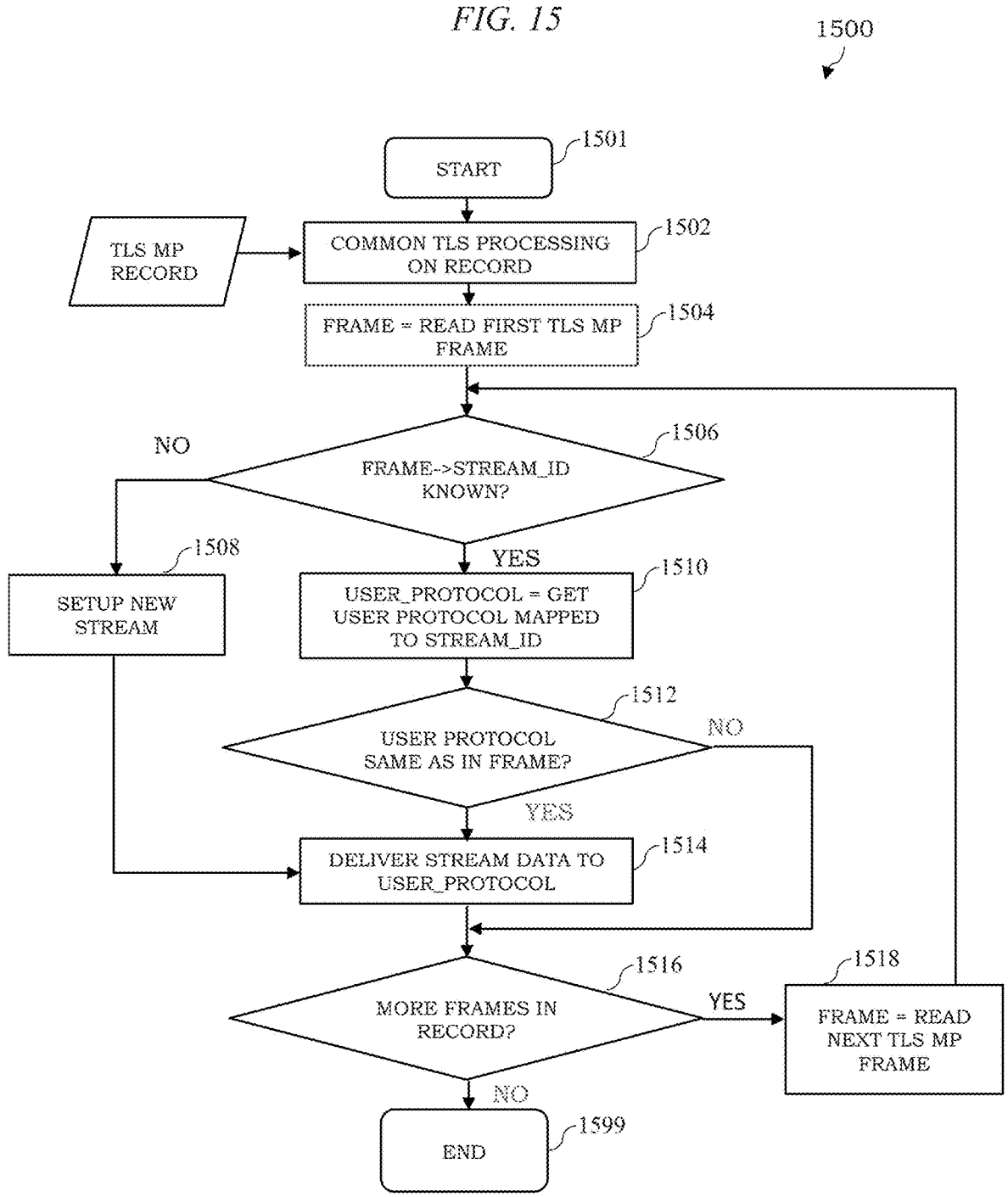
FIG. 15 depicts an example embodiment of a method for use by a communication device to process a TLS MP Record from a peer.

FIG. 15 depicts an example embodiment of a method for use by a communication device to process a TLS MP Record from a peer. It will be appreciated that, although primarily presented as being performed serially, at least a portion of the functions of method 1500 may be performed contemporaneously or in a different order than as presented with respect to FIG. 15. At block 1501, method 1500 begins. As indicated in FIG. 15, the input to the method 1500 is a TLS MP Record received from a peer. Block 1502 performs processing on the TLS MP Record (e.g., as defined by the TLS specification), and then the method 1500 proceeds to block 1504. Block 1504 reads the first TLS MP Frame in the TLS MP Record, and then the method 1500 proceeds to block 1506. Block 1506 checks if state for the Stream ID exists. If state for the Stream ID does not exist, this means that this is the first packet received on this stream and the state for the stream needs to be created, so the method 1500 proceeds to block 1508. If state for the Stream ID exists, then the method 1500 proceeds to block 1510. Block 1508 creates the state for the Stream ID, sets the peer as the owner of the Stream ID, and then maps the Stream ID to the user protocol (found from the Layer Type and Protocol ID field in TLS MP Frame), and then the method 1500 proceeds to block 1514. Block 1510 retrieves the user protocol mapped to the Stream ID based on its existing state, and then the method 1500 proceeds to block 1512. Block 1512 verifies if the Layer Type and Protocol ID in the TLS MP Frame is the same as the user protocol. If the Layer Type and Protocol ID in the TLS MP Frame is not the same as the user protocol, then this Frame is skipped and the method 1500 proceeds to block 1516. If the Layer Type and Protocol ID in the TLS MP Frame is the same as the user protocol, then the method 1500 proceeds to block 1514. Block 1514 reads the Stream Data from the TLS MP Frame and delivers it to the user protocol, and then the method 1500 proceeds to block 1516. Block 1516 checks whether there are more TLS MP Frames to parse in the TLS MP Record. If the TLS MP Record has more Frames, then the method 1500 proceeds to block 1518. If the TLS MP Record does not have more TLS MP Frames, then the method 1500 proceeds to block 1599, where the method 1500 ends. Block 1518 reads the next TLS MP Frame and then the method 1500 returns to block 1506 to process the next TLS MP Frame of the TLS MP Record. At block 1599, the method 1500 ends.

Figure 16:
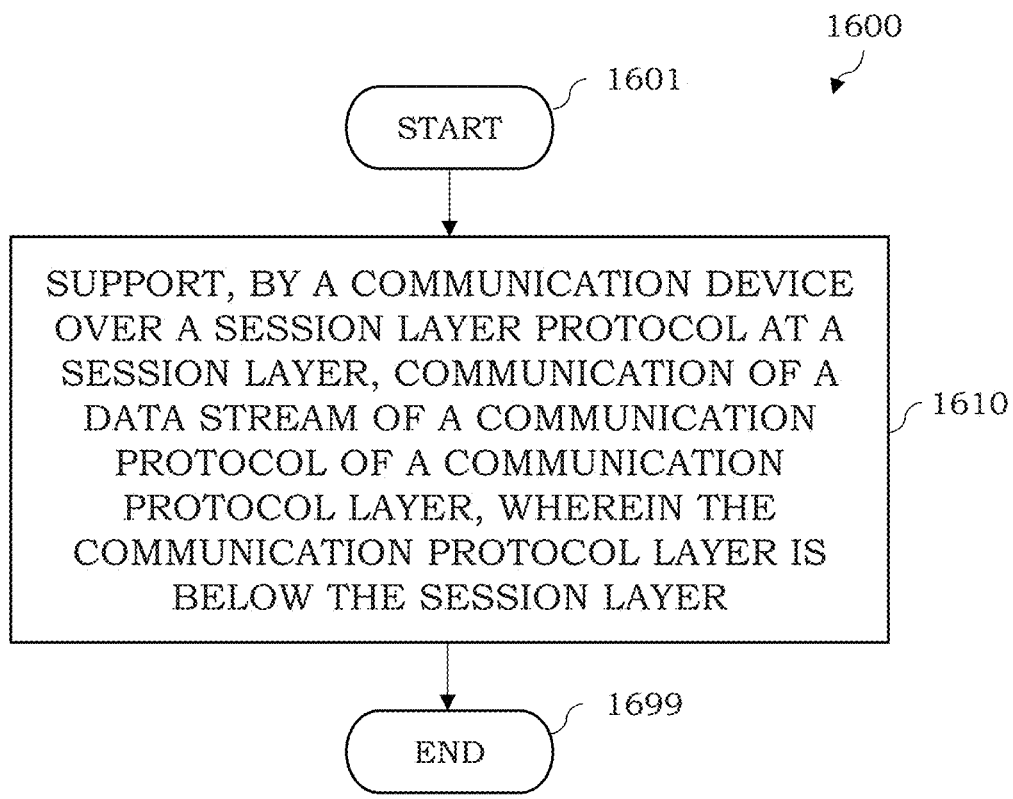
FIG. 16 depicts an example embodiment of a method for use by a communication device to support communication of data over a TLS session.

FIG. 16 depicts an example embodiment of a method for use by a communication device to support communication of data over a TLS session. It will be appreciated that, although primarily presented as being performed serially, at least a portion of the functions of method 1600 may be performed contemporaneously or in a different order than as presented with respect to FIG. 16. At block 1601, method 1600 begins. At block 1610, support, by a communication device over a session layer protocol at a session layer, communication of a data stream of a communication protocol of a communication protocol layer, wherein the communication protocol layer is below the session layer. At block 1699, the method 1600 ends. In at least some example embodiments, the communication protocol layer includes at least one of a transport layer, a network layer, or a data link layer. In at least some example embodiments, support for communication of the data stream of the communication protocol of the communication protocol layer may include support, by the communication device, for negotiation of a set of communication protocols to be supported on the session layer protocol. In at least some example embodiments, support for negotiation of the set of communication protocols may include sending, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a TLS protocol, and the message includes a TLS handshake message. In at least some example embodiments, support for negotiation of the set of communication protocols may include receiving, by the communication device from a second communication device, a message including an indication of a set of communication protocols supported by the second communication device at the session layer and selecting, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, support for communication of the data stream of the communication protocol of the communication protocol layer may include supporting, by the communication device over the session layer protocol of the session layer, communication of a packet of the session layer protocol that includes a packet of the data stream. In at least some example embodiments, the packet of the data stream includes a payload including data of the data stream and the packet of the data stream includes a header including an indication of the communication protocol layer of the data stream, an indication of the communication protocol of the data stream, and a stream identifier of the data stream. In at least some example embodiments, the session layer protocol includes a TLS protocol, the packet of the session layer protocol includes a TLS Record, and the packet of the data stream is transported using a TLS Frame. In at least some example embodiments, support for communication of the data stream of the communication protocol of the communication protocol layer may include sending, by the communication device over the session layer protocol of the session layer, a packet of the session layer protocol that includes a packet of the data stream. In at least some example embodiments, support for communication of the data stream of the communication protocol of the communication protocol layer may include receiving, by the communication device over the session layer protocol of the session layer, a packet of the session layer protocol that includes a packet of the data stream wherein the packet of the data stream includes a payload including data of the data stream and the packet of the data stream includes a header including an indication of the communication protocol layer of the data stream, an indication of the communication protocol of the data stream, and a stream identifier of the data stream, and retrieving, based on identification of the data of the data stream based on the indication of the communication protocol layer of the data stream, the indication of the communication protocol of the data stream, and the stream identifier of the data stream, the data of the data stream. In at least some example embodiments, the method includes supporting, by the communication device over the session layer protocol, communication of a second data stream. In at least some example embodiments, the second data stream uses the communication protocol of the communication protocol layer. In at least some example embodiments, the second data stream uses a second communication protocol of the communication protocol layer. In at least some example embodiments, the second data stream uses a second communication protocol of a second communication protocol layer. In at least some example embodiments, the second communication protocol layer includes one of an application layer, a transport layer, a network layer, or a data link layer. It will be appreciated that various packet communication support functions presented herein with respect to FIGS. 1-15 may be incorporated within the context of method 1600 of FIG. 16.

Figure 17:
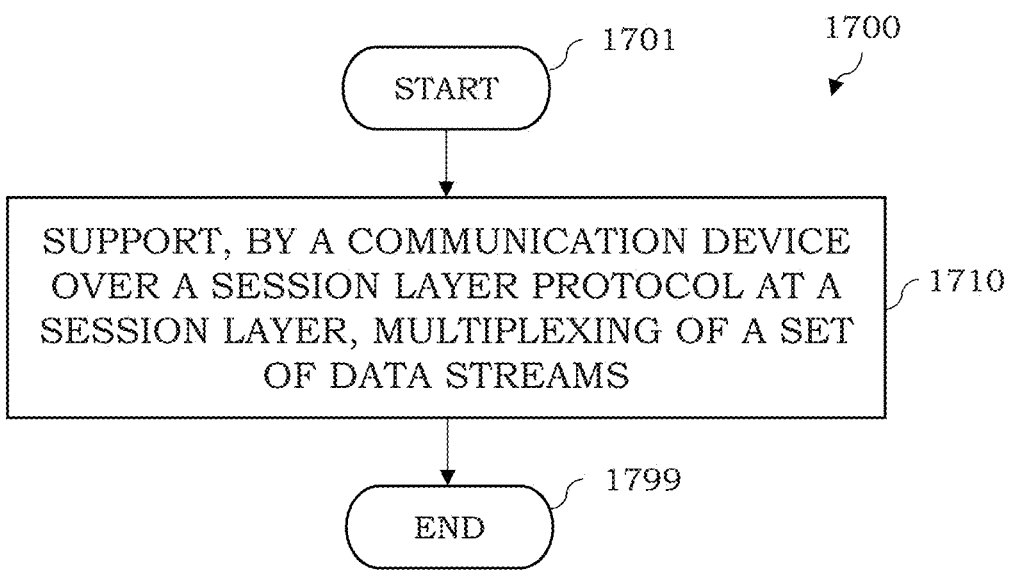
FIG. 17 depicts an example embodiment of a method for use by a communication device to support communication of data over a TLS session.

FIG. 17 depicts an example embodiment of a method for use by a communication device to support communication of data over a TLS session. It will be appreciated that, although primarily presented as being performed serially, at least a portion of the functions of method 1700 may be performed contemporaneously or in a different order than as presented with respect to FIG. 17. At block 1701, method 1700 begins. At block 1710, support, by a communication device over a session layer protocol at a session layer, multiplexing of a set of data streams. At block 1799, method 1700 ends. In at least some example embodiments, the set of data streams includes at least two data streams at a communication protocol layer above the session layer. In at least some example embodiments, the set of data streams includes at least two data streams at a communication protocol layer below the session layer. In at least some example embodiments, the set of data streams includes a first data stream at a first communication protocol layer and a second data stream at a second communication protocol layer, wherein the first communication protocol layer and the second communication protocol layer are different. In at least some example embodiments, the first communication protocol layer is an application layer protocol and the second communication protocol layer is a communication protocol layer below the session layer. In at least some example embodiments, the first communication protocol layer and the second communication protocol layer are below the session layer. In at least some example embodiments, support for multiplexing of the set of data streams may include supporting, by the communication device, negotiation of a set of communication protocols to be supported on the session layer protocol. In at least some example embodiments, support for negotiation of the set of communication protocols to be supported on the session layer protocol may include sending, from the communication device toward a second communication device, a message including an indication of a set of communication protocols supported by the communication device at the session layer. In at least some example embodiments, the indication of the set of communication protocols supported by the communication device at the session layer includes a tuple including an indication of a communication protocol layer supported by the communication device at the session layer and a list of communication protocols support by the communication device at the communication protocol layer supported by the communication device at the session layer. In at least some example embodiments, the session layer protocol includes a TLS protocol and the message includes a TLS handshake message. In at least some example embodiments, support for negotiation of the set of communication protocols includes receiving, by the communication device from a second communication device, a message including an indication of a set of communication protocols supported by the second communication device at the session layer and selecting, by the communication device based on an indication of a set of communication protocols supported by the communication device at the session layer and based on the indication of the set of communication protocols supported by the second communication device at the session layer, the set of communication protocols to be supported on the session layer protocol. In at least some example embodiments, support for multiplexing of the set of data streams may include supporting, by the communication device over the session layer protocol of the session layer, communication of a packet of the session layer protocol that includes, for each of the data streams, a respective packet of the respective data stream. In at least some example embodiments, for at least one of the data streams, the respective packet of the respective data stream includes a payload including data of the respective data stream and the packet of the respective data stream includes a header including an indication of the communication protocol layer of the respective data stream, an indication of the communication protocol of the respective data stream, and a stream identifier of the respective data stream. In at least some example embodiments, the session layer protocol includes a TLS protocol, the packet of the session layer protocol includes a TLS Record, and the respective packets of the respective data streams are transported using respective TLS Frames. In at least some example embodiments, support for multiplexing of the set of data streams includes sending, by the communication device over the session layer protocol of the session layer, a packet of the session layer protocol that includes, for each of the data streams, a respective packet of the respective data stream. In at least some example embodiments, support for multiplexing of the set of data streams may include receiving, by the communication device over the session layer protocol of the session layer, a packet of the session layer protocol that includes, for each of the data streams, a respective packet of the respective data stream including a payload including data of the respective data stream and including a header including an indication of the communication protocol layer of the respective data stream, an indication of the communication protocol of the respective data stream, and a stream identifier of the respective data stream and retrieving, for each of the data streams from the packet of the session layer protocol based on identification of the data of the data stream based on the indication of the communication protocol layer of the respective data stream, the indication of the communication protocol of the respective data stream, and the stream identifier of the respective data stream, the data of the respective data stream.

It will be appreciated that various packet communication support functions presented herein with respect to FIGS. 1-15 may be incorporated within the context of method 1700 of FIG. 17.

It will be appreciated that although primarily presented herein with respect to example embodiments in which the secure session is provided using a particular protocol (namely, the TLS protocol) at a particular layer of the OSI model (namely, the session layer), various example embodiments presented herein may be used or adapted for use with various types of communication protocols which may be provided at various layers of the OSI model or at various layers which may be defined within various other types of protocol layer models (e.g., FiberChannel, or the like).

It will be appreciated that, although primarily presented herein with respect to example embodiments in which particular communication protocol layers and associated communication protocols are transported over the secure session, various example embodiments presented herein may be used or adapted for use in supporting various other communication protocols, various other communication protocol layers, or the like, as well as various combinations thereof. For example, it will be appreciated that, although primarily presented herein with respect to example embodiments in which the transport layer protocols of the transport layer include transport protocols (e.g., TCP, SCTP, UDP, or the like), the transport layer protocols of the transport layer may include any protocols which may run atop the network layer (e.g., Internet Control Message Protocol (ICMP), Open Shortest Path First (OSPF), OSPF version 3 (OSPFv3), Resource Reservation Protocol (RSVP), or the like)). In other words, the scope of "transport layer" herein is not necessarily limited to transport protocols, but also or alternatively may include various protocols which may run atop the network layer. It will be appreciated that various example embodiments presented herein may be used or adapted for use in supporting various other communication protocols, various other communication protocol layers, or the like, as well as various combinations thereof.

Various example embodiments for supporting secure communications via secure sessions in communication systems may provide various advantages or potential advantages.

For example, various example embodiments for supporting secure communications via secure sessions in communication systems may provide improved support for secure communications (e.g., support for tunneling at any communication protocol layer, support for multiplexing of communications at multiple communication protocol layers, or the like, as well as various combinations thereof) via secure sessions at the session layer using session layer protocols such as the TLS protocol, the DTLS protocol, or the like.

For example, various example embodiments for supporting secure communications via secure sessions in communication systems may provide improved support for secure communications (e.g., support for tunneling at any communication protocol layer, support for multiplexing of communications at multiple communication protocol layers, or the like, as well as various combinations thereof) via secure sessions at the session layer using session layer protocols with minimal changes to the session layer protocols (e.g., modifying the TLS protocol (e.g., the TLS Handshake protocol of the TLS protocol) to support negotiation of communication protocols of communication protocol layers, modifying the TLS protocol (e.g., the TLS Record protocol of the TLS protocol) to support multiplexing of multiple data streams at one or more communication protocol layers over a single session layer session, or the like, as well as various combinations thereof).

For example, various example embodiments for supporting secure communications via secure sessions in communication systems may enable tunneling of any communication protocol, not just application layer protocols, over the TLS protocol (e.g., data link layer protocols, network layer protocols, transport layer protocols, application layer protocols, or the like, as well as various combinations thereof. For example, various example embodiments for supporting secure communications via secure sessions in communication systems, by supporting tunneling of any communication protocol over the TLS protocol, may enable support for various types of overlay networks (e.g., individual overlay networks, multiplexing of multiple overlay networks, or the like). For example, an overlay network is a private network (sort of a VPN) that runs atop a public network and, when the overlay network requires both security and reliable delivery of its packets, then a potential solution is to tunnel the packets of the overlay network over a TLS session based on various example embodiments for supporting secure communications via secure sessions in communication systems. It will be appreciated that support for such overlay networks and/or multiplexing of multiple overlay networks may enable support for various types of emerging technologies, such a secured network overlays (e.g., secured SD-WAN or the like).

For example, various example embodiments for supporting secure communications via secure sessions in communication systems may enable multiplexing of multiple protocol streams (at a single communication protocol layer or across multiple communication protocol layers) over a single TLS session, thereby obviating the need to use multiple separate TLS sessions to secure the multiple protocol streams. For example, various example embodiments for supporting secure communications via secure sessions in communication systems, by supporting multiplexing of multiple protocol streams over a single TLS session, may obviate the need for a router that is operating as a security gateway to maintain multiple TLS sessions with each peering security router with which the router has a peering relationship. This may be further understood by considering a gateway security router that has TLS sessions to thousands of peering routers. For example, a router may have TLS sessions to thousands of peering routers and to each peering router it may need to exchange packets for many applications using TLS. In that case, running separate TLS session for each application to a peering router is not a scalable solution. For example, if a router has peering with 10K routers and running 5 applications with each peer router then the router needs 50K TLS sessions (as well as the same number of TCP connections), which is simply not a scalable proposition. In this example, using various example embodiments presented herein, such a security gateway router is able to run one TLS session with each of the peers, irrespective of number of TLS-based secured applications to respective peers, thereby providing a significant reduction in the number of TLS sessions and underlying transport layer connections (e.g., for the router above that has peering with 10K routers, the number of TLS sessions supported by the router may be reduced from 50K TLS sessions to 10K TLS sessions).

For example, various example embodiments for supporting secure communications via secure sessions in communication systems, by supporting tunneling of any communication protocol over the TLS protocol and/or supporting multiplexing of multiple protocol streams over a single TLS session, may open up a wide range of possibilities in applicability of the TLS protocol (e.g., providing secured and reliable overlay networks, building secured and reliable infrastructure interconnects, or the like, as well as various combinations thereof).

Various example embodiments supporting secure communications via secure sessions in communication system may provide various other advantages or potential advantages.

Figure 18:
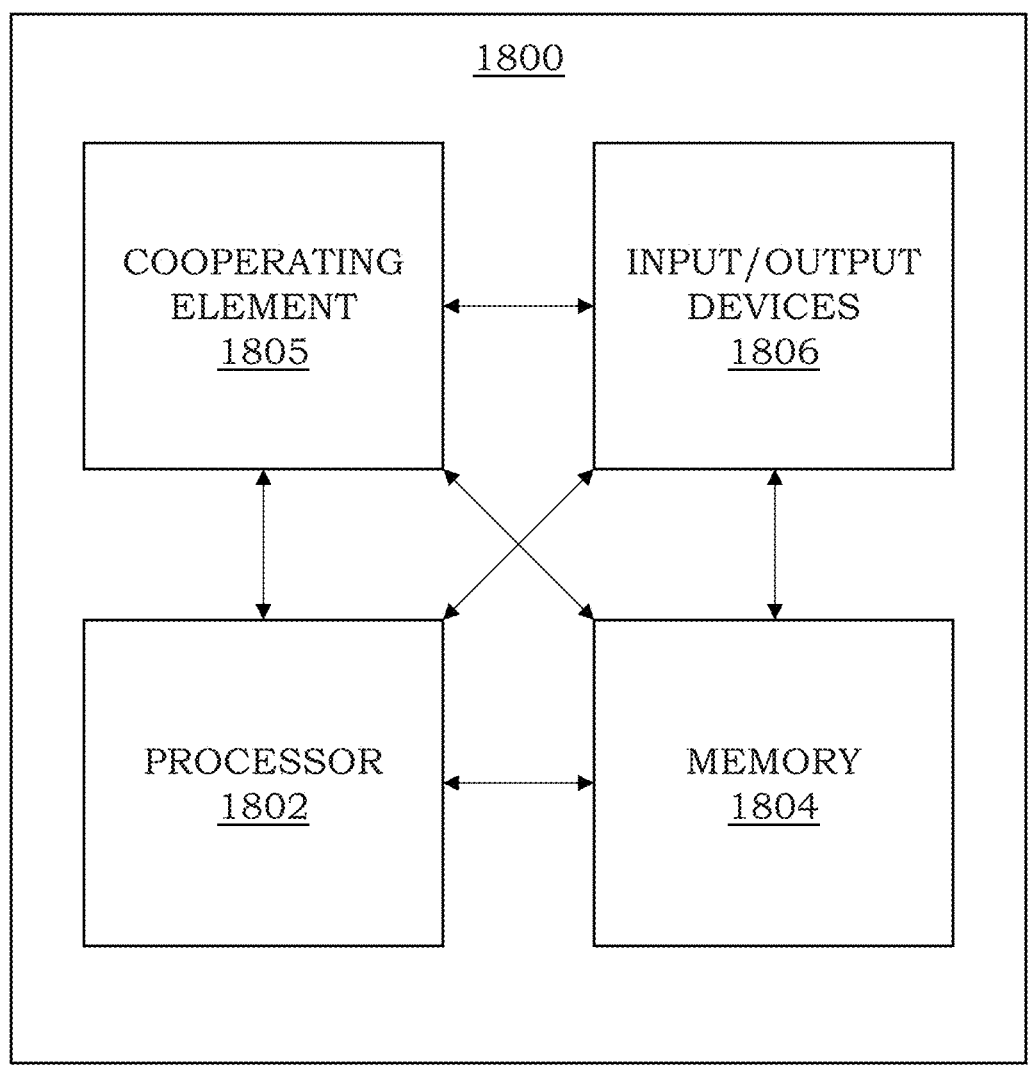
FIG. 18 depicts an example embodiment of a computer suitable for use in performing various functions presented herein.

FIG. 18 depicts an example embodiment of a computer suitable for use in performing various functions presented herein.

The computer 1800 includes a processor 1802 (e.g., a central processing unit (CPU), a processor, a processor having a set of processor cores, a processor core of a processor, or the like) and a memory 1804 (e.g., a random access memory, a read only memory, or the like). The processor 1802 and the memory 1804 may be communicatively connected. In at least some example embodiments, the computer 1800 may include at least one processor and at least one memory including computer program code, wherein the at least one memory and the computer program code are configured to, with the at least one processor, cause the computer to perform various functions presented herein.

The computer 1800 also may include a cooperating element 1805. The cooperating element 1805 may be a hardware device. The cooperating element 1805 may be a process that can be loaded into the memory 1804 and executed by the processor 1802 to implement various functions presented herein (in which case, for example, the cooperating element 1805 (including associated data structures) can be stored on a non-transitory computer-readable storage medium, such as a storage device or other suitable type of storage element (e.g., a magnetic drive, an optical drive, or the like)).

The computer 1800 also may include one or more input/output devices 1806. The input/output devices 1806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1800 may represent a general architecture and functionality suitable for implementing functional elements described herein, portions of functional elements described herein, or the like, as well as various combinations thereof. For example, computer 1800 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus to:
support, by a communication device, negotiation of a set of communication protocols to be supported on a session layer protocol of a session layer, wherein the negotiation includes:
receiving, by the communication device from a second communication device, a message including an indication of a set of communication protocols supported by the second communication device at the session layer; and
selecting, by the communication device based on an indication of a set of communication protocols supported by the communication device at the session layer and based on the indication of the set of communication protocols supported by the second communication device at the session layer, the set of communication protocols to be supported on the session layer protocol;
support, by the communication device, communication of data of a communication protocol, from the set of communication protocols, within a frame of the session layer protocol, wherein the communication protocol operates at a communication protocol layer, wherein the frame includes an indication of the communication protocol layer, an indication of the communication protocol, and the data of the communication protocol.

2. The apparatus of claim 1, wherein the communication protocol layer includes at least one of an application layer, a transport layer, a network layer, or a data link layer.

3. The apparatus of claim 1, wherein the negotiation includes:
sending, from the communication device toward the second communication device, a message including an indication of a set of communication protocols supported by the communication device at the session layer.

4. The apparatus of claim 3, wherein the indication of the set of communication protocols supported by the communication device at the session layer includes a tuple including an indication of a communication protocol layer supported by the communication device at the session layer and a list of communication protocols supported by the communication device at the communication protocol layer supported by the communication device at the session layer.

5. The apparatus of claim 3, wherein the session layer protocol includes a Transport Layer Security (TLS) protocol, wherein the message includes a TLS handshake message.

6. The apparatus of claim 1, wherein, to support communication of the data of the communication protocol, the instructions, when executed by the at least one processor, cause the apparatus to:
support, by the communication device over the session layer protocol of the session layer, communication of a packet of the session layer protocol that includes the frame of the session layer protocol.

7. The apparatus of claim 6, wherein the session layer protocol includes a Transport Layer Security (TLS) protocol, wherein the packet of the session layer protocol includes a TLS Record, wherein the frame of the session layer protocol includes a TLS Frame.

8. The apparatus of claim 1, wherein, to support communication of the data of the communication protocol, the instructions, when executed by the at least one processor, cause the apparatus to:
receive, by the communication device over the session layer protocol of the session layer, a packet of the session layer protocol that includes the frame of the session layer protocol; and
retrieve, from the packet of the session layer protocol based on identification of the data of the communication protocol based on the indication of the communication protocol layer and the indication of the communication protocol, the data of the communication protocol.

9. The apparatus of claim 1, wherein the instructions, when executed by the at least one processor, cause the apparatus to:
support, by the communication device, communication of second data over the session layer protocol.

10. The apparatus of claim 9, wherein the second data is based on the communication protocol of the communication protocol layer.

11. The apparatus of claim 9, wherein the second data is based on a second communication protocol, of the communication protocol layer, from the set of communication protocols.

12. The apparatus of claim 9, wherein the second data is based on a second communication protocol, of a second communication protocol layer, from the set of communication protocols.

13. The apparatus of claim 12, wherein the second communication protocol layer includes one of an application layer, a transport layer, a network layer, or a data link layer.

14. A non-transitory computer-readable medium storing program instructions which, when executed by an apparatus, cause the apparatus to:
support, by a communication device, negotiation of a set of communication protocols to be supported on a session layer protocol of a session layer, wherein the negotiation includes:
receiving, by the communication device from a second communication device, a message including an indication of a set of communication protocols supported by the second communication device at the session layer; and
selecting, by the communication device based on an indication of a set of communication protocols supported by the communication device at the session layer and based on the indication of the set of communication protocols supported by the second communication device at the session layer, the set of communication protocols to be supported on the session layer protocol;
support, by the communication device, communication of data of a communication protocol, from the set of communication protocols, within a frame of the session layer protocol, wherein the communication protocol operates at a communication protocol layer, wherein the frame includes an indication of the communication protocol layer, an indication of the communication protocol, and the data of the communication protocol.

15. A method, comprising:
supporting, by a communication device, negotiation of a set of communication protocols to be supported on a session layer protocol of a session layer, wherein the negotiation includes:
receiving, by the communication device from a second communication device, a message including an indication of a set of communication protocols supported by the second communication device at the session layer; and
selecting, by the communication device based on an indication of a set of communication protocols supported by the communication device at the session layer and based on the indication of the set of communication protocols supported by the second communication device at the session layer, the set of communication protocols to be supported on the session layer protocol;
supporting, by the communication device, communication of data of a communication protocol, from the set of communication protocols, within a frame of the session layer protocol, wherein the communication protocol operates at a communication protocol layer, wherein the frame includes an indication of the communication protocol layer, an indication of the communication protocol, and the data of the communication protocol.

\* \* \* \* \*